United States Patent
Guo et al.

(10) Patent No.: US 10,104,658 B2
(45) Date of Patent: Oct. 16, 2018

(54) METHOD AND APPARATUS FOR DELIVERY OF CONTROL SIGNALING IN A WIRELESS COMMUNICATION SYSTEM

(71) Applicant: ASUSTeK Computer Inc., Taipei (TW)

(72) Inventors: Yu-Hsuan Guo, Taipei (TW); Ko-Chiang Lin, Taipei (TW); Richard Lee-Chee Kuo, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 4 days.

(21) Appl. No.: 15/175,673

(22) Filed: Jun. 7, 2016

(65) Prior Publication Data
US 2016/0366687 A1    Dec. 15, 2016

Related U.S. Application Data

(60) Provisional application No. 62/174,716, filed on Jun. 12, 2015, provisional application No. 62/183,460, filed on Jun. 23, 2015.

(51) Int. Cl.
*H04W 72/04* (2009.01)
*H04W 24/08* (2009.01)
(Continued)

(52) U.S. Cl.
CPC ....... *H04W 72/0446* (2013.01); *H04L 1/1812* (2013.01); *H04L 5/005* (2013.01);
(Continued)

(58) Field of Classification Search
CPC ..... H04L 1/1812; H04L 5/005; H04L 5/0051; H04L 5/0053; H04L 5/0055;
(Continued)

(56) References Cited

U.S. PATENT DOCUMENTS 9,432,985 B2 *  8/2016  Lee ................. H04L 5/0037
2012/0040691 A1 *  2/2012  Han ................. G01S 1/042
                                                                455/456.1
(Continued)

FOREIGN PATENT DOCUMENTS

JP    2013-504248    2/2013
JP    2013-157822    8/2013
(Continued)

OTHER PUBLICATIONS

Office Action from Japanese Patent Office from corresponding JP Patent Application No. 2016-114736, dated Sep. 21, 2017.
(Continued)

*Primary Examiner* — Brian D Nguyen
(74) *Attorney, Agent, or Firm* — Blue Capital Law Firm, P.C.

(57) ABSTRACT

A method and apparatus for delivery of control signaling in a wireless communication system are disclosed. In one embodiment, the method includes communicating with a UE (User Equipment) in the cell via downlink and uplink transmissions, wherein the downlink and uplink transmissions are organized into radio frames and each radio frame contains multiple subframes and each subframe contains multiple symbols. The method also includes transmitting, in the cell, a UE specific signal in a first symbol of a downlink control region of a subframe of the multiple subframes, wherein the network node is not allowed to transmit a common signal in the first symbol.

34 Claims, 19 Drawing Sheets

(51) Int. Cl.
*H04L 1/18* (2006.01)
*H04L 5/00* (2006.01)
*H04B 7/06* (2006.01)
*H04L 25/02* (2006.01)

(52) U.S. Cl.
CPC .......... *H04L 5/0051* (2013.01); *H04L 5/0053* (2013.01); *H04L 5/0055* (2013.01); *H04W 24/08* (2013.01); *H04W 72/042* (2013.01); *H04W 72/046* (2013.01); *H04B 7/0617* (2013.01); *H04L 25/0204* (2013.01); *H04L 25/0224* (2013.01)

(58) Field of Classification Search
CPC .......... H04L 25/0224; H04L 25/0204; H04W 24/08; H04W 72/042; H04W 72/0446; H04W 72/046; H04B 7/0617
See application file for complete search history.

(56) References Cited

U.S. PATENT DOCUMENTS

| | | |
|---|---|---|
| 2013/0183987 A1 | 7/2013 | Vrzic et al. |
| 2013/0201925 A1 | 8/2013 | Li et al. |
| 2014/0119349 A1* | 5/2014 | Takano ............... H04W 16/32 370/336 |
| 2014/0241276 A1* | 8/2014 | Berberana ............ H04L 5/0073 370/329 |
| 2014/0362758 A1* | 12/2014 | Lee ..................... H04L 5/0037 370/312 |
| 2015/0016370 A1 | 1/2015 | Takeda |
| 2015/0098421 A1* | 4/2015 | Barbieri ............. H04W 72/042 370/329 |
| 2015/0188684 A1 | 7/2015 | Takeda |
| 2015/0289235 A1* | 10/2015 | Park ..................... H04L 5/001 370/329 |
| 2016/0087707 A1* | 3/2016 | Guey .................. H04L 27/2613 375/267 |
| 2016/0094374 A1* | 3/2016 | Koorapaty ........... H04L 27/262 370/329 |
| 2016/0294527 A1* | 10/2016 | Yoon ................. H04W 72/0446 |
| 2016/0345306 A1* | 11/2016 | Lee ....................... H04L 5/0037 |

FOREIGN PATENT DOCUMENTS

| | | |
|---|---|---|
| WO | 2011031058 | 3/2011 |
| WO | 2013119659 | 8/2013 |
| WO | 2013168562 | 11/2013 |

OTHER PUBLICATIONS

Erik Dahlman et al., "Downlink Physical-Layer Processing—Chapter 10" In:"4G LTE/LTE-Advanced for Mobile Broadband", Oct. 7, 2013 (Oct. 7, 2013), Elsevier, XP055249210, pp. 161-240.
European Search Report from corresponding EP Application No. 16173601.2, dated Aug. 31, 2016.
3GPP TS 36.211 V12.5.0 (Mar. 26, 2015).
Project Name:Mobile and wireless communications Enablers for the Twenty-twenty Information Society (METIS) Deliverable D2.4 ,Document No. ICT-317669-METIS/D2.4 (Feb. 28, 2015).
3GPP TS 36.331 V12.5.0 (Mar. 27, 2015).
Notice of Non-Final Rejection from corresponding Korean Application No. 10-2016-0071321, dated Aug. 21, 2017.

* cited by examiner

| Configuration | | $N_{sc}^{RB}$ | $N_{symb}^{DL}$ |
|---|---|---|---|
| Normal cyclic prefix | $\Delta f = 15\,\text{kHz}$ | 12 | 7 |
| Extended cyclic prefix | $\Delta f = 15\,\text{kHz}$ | | 6 |
| | $\Delta f = 7.5\,\text{kHz}$ | 24 | 3 |

FIG. 8 (PRIOR ART)

| PHICH duration | Non-MBSFN subframes | | MBSFN subframes on a carrier supporting PDSCH |
|---|---|---|---|
| | Subframes 1 and 6 in case of frame structure type 2 | All other cases | |
| Normal | 1 | 1 | 1 |
| Extended | 2 | 3 | 2 |

FIG. 9 (PRIOR ART)

| Antenna port $p$ | $[\bar{w}_p(0)\ \bar{w}_p(1)\ \bar{w}_p(2)\ \bar{w}_p(3)]$ |
|---|---|
| 7 | $[+1\ +1\ +1\ +1]$ |
| 8 | $[+1\ -1\ +1\ -1]$ |
| 9 | $[+1\ +1\ +1\ +1]$ |
| 10 | $[+1\ -1\ +1\ -1]$ |
| 11 | $[+1\ +1\ -1\ -1]$ |
| 12 | $[-1\ -1\ +1\ +1]$ |
| 13 | $[+1\ -1\ -1\ +1]$ |
| 14 | $[-1\ +1\ +1\ -1]$ |

FIG. 10 (PRIOR ART)

| Antenna port $p$ | $[\bar{w}_p(0)\ \bar{w}_p(1)]$ |
|---|---|
| 7 | $[+1\ +1]$ |
| 8 | $[-1\ +1]$ |

FIG. 11 (PRIOR ART)

METHOD AND APPARATUS FOR DELIVERY OF CONTROL SIGNALING IN A WIRELESS COMMUNICATION SYSTEM

CROSS-REFERENCE TO RELATED APPLICATIONS

The present application claims the benefit of U.S. Provisional Patent Application Ser. No. 62/174,716 filed on Jun. 12, 2015 and U.S. Provisional Patent Application Ser. No. 62/183,460 filed on Jun. 23, 2015, the entire disclosures of which are incorporated herein in their entirety by reference.

FIELD

This disclosure generally relates to wireless communication networks, and more particularly, to a method and apparatus for delivery of control signaling in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus for delivery of control signaling in a wireless communication system are disclosed. In one embodiment, the method includes communicating with a UE (User Equipment) in the cell via downlink and uplink transmissions, wherein the downlink and uplink transmissions are organized into radio frames and each radio frame contains multiple subframes and each subframe contains multiple symbols. The method also includes transmitting, in the cell, a UE specific signal in a first symbol of a downlink control region of a subframe of the multiple subframes, wherein the network node is not allowed to transmit a common signal in the first symbol.

BRIEF DESCRIPTION OF THE DRAWINGS

FIG. 8 is a reproduction of Table 6.2.3-1 of 3GPP TS 36.211.

FIG. 9 is a reproduction of Table 6.9.3-1 of 3GPP TS 36.211.

FIG. 10 is a reproduction of Table 6.10.3.2-1 of 3GPP TS 36.211.

FIG. 11 is a reproduction of Table 6.10.3.2-2 of 3GPP TS 36.211.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support the wireless technology discussed in the various documents, including: "DOCOMO 5G White Paper" by NTT Docomo, Inc. and METIS Deliverable D2.4, "Proposed solutions for new radio access". Furthermore, the exemplary wireless communication systems devices described below may be designed to support one or more standards such as the standard offered by a consortium named "3rd Generation Partnership Project" referred to herein as 3GPP, including: TS 36.300 V12.5.0, "E-UTRA and E-UTRAN Overall description"; 3GPP TS 36.211 V12.5.0, "E-UTRA Physical channels and modulation"; TS 36.331 V12.5.0, "E-UTRA RRC protocol specification"; TS 36.321 V12.5.0, "E-UTRA MAC protocol specification"; and TS 36.213 V12.5.0, "E-UTRA Physical layer procedures". The standards and documents listed above are hereby expressly incorporated by reference in their entirety.

Figure 1:
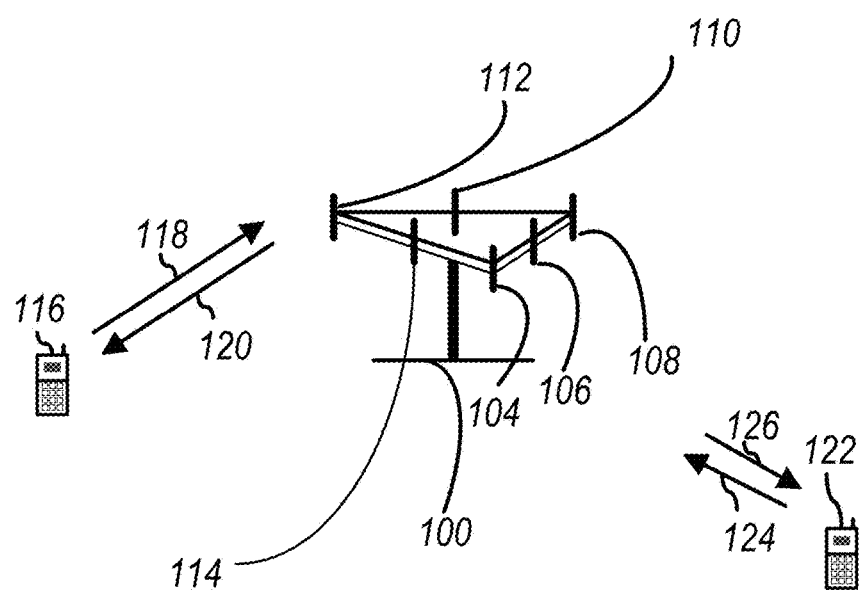
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
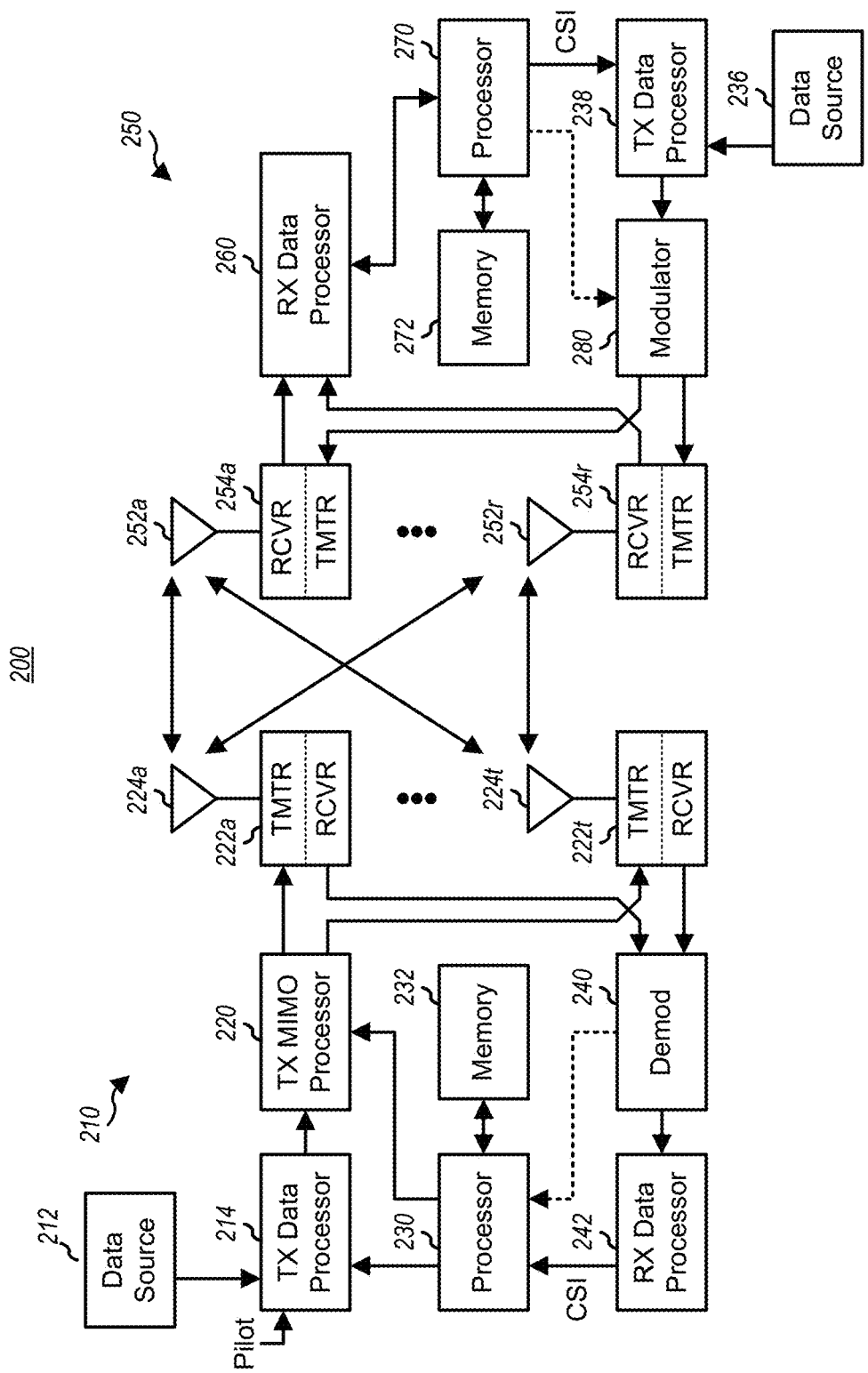
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
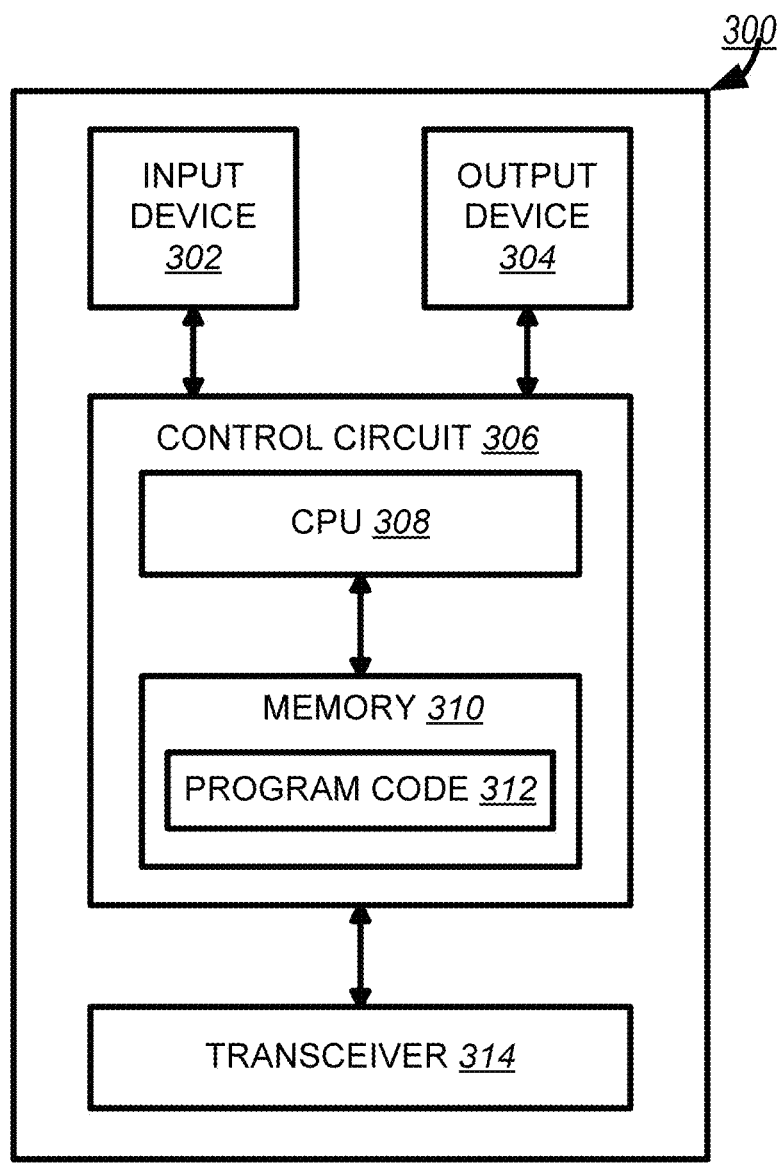
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
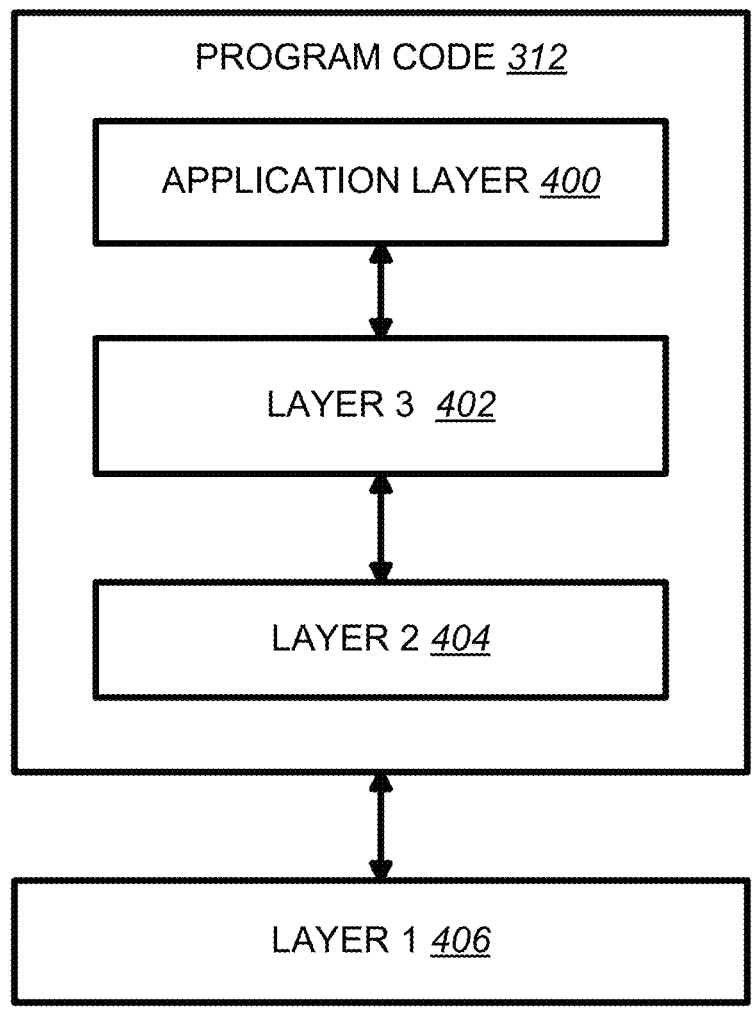
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Frame structure in LTE, as discussed in 3GPP TS 36.300, is organized into radio frames and each radio frame (e.g., 10 ms) is divided into ten subframes. Each subframe may include two slots:

5. Physical Layer for E-UTRA

Downlink and uplink transmissions are organized into radio frames with 10 ms duration. Two radio frame structures are supported:

Type 1, applicable to FDD;
Type 2, applicable to TDD.

Figure 5:
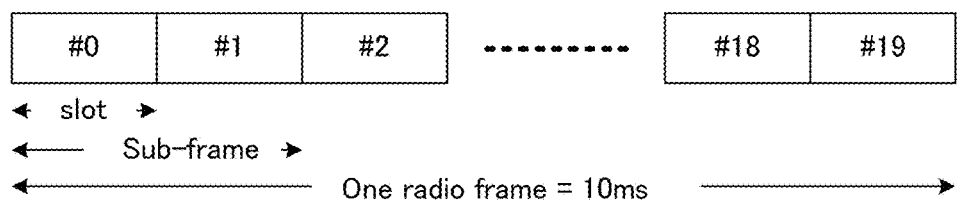
FIG. 5 is a reproduction of FIGS. 5.1-1 of 3GPP TS 36.300.

Frame structure Type 1 is illustrated in FIGS. 5.1-1 [which is reproduced as FIG. 5 of the present application]. Each 10 ms radio frame is divided into ten equally sized sub-frames. Each sub-frame consists of two equally sized slots. For FDD, 10 subframes are available for downlink transmission and 10 subframes are available for uplink transmissions in each 10 ms interval. Uplink and downlink transmissions are separated in the frequency domain.

Figure 6:
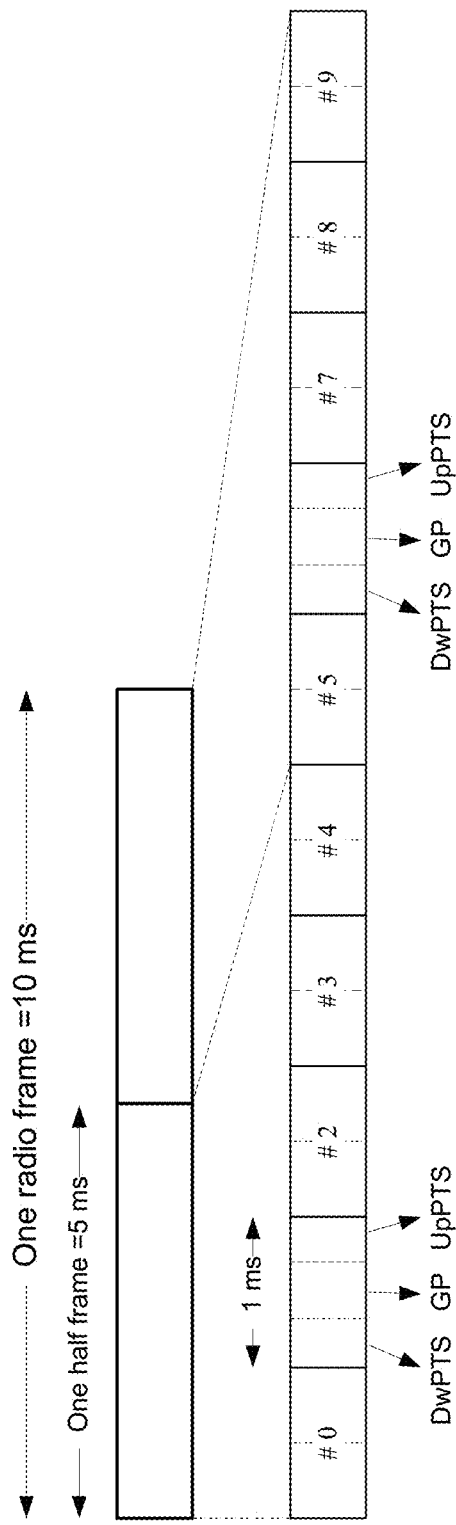
FIG. 6 is a reproduction of FIGS. 5.1-2 of 3GPP TS 36.300.

Frame structure Type 2 is illustrated in FIGS. 5.1-2 [which is reproduced as FIG. 6 of the present application]. Each 10 ms radio frame consists of two half-frames of 5 ms each. Each half-frame consists of eight slots of length 0.5 ms and three special fields: DwPTS, GP and UpPTS. The length of DwPTS and UpPTS is configurable subject to the total length of DwPTS, GP and UpPTS being equal to 1 ms. Both 5 ms and 10 ms switch-point periodicity are supported. Subframe 1 in all configurations and subframe 6 in configuration with 5 ms switch-point periodicity consist of DwPTS, GP and UpPTS. Subframe 6 in configuration with 10 ms switch-point periodicity consists of DwPTS only. All other subframes consist of two equally sized slots.

For TDD, GP is reserved for downlink to uplink transition. Other Subframes/Fields are assigned for either downlink or uplink transmission. Uplink and downlink transmissions are separated in the time domain.

Figure 7:
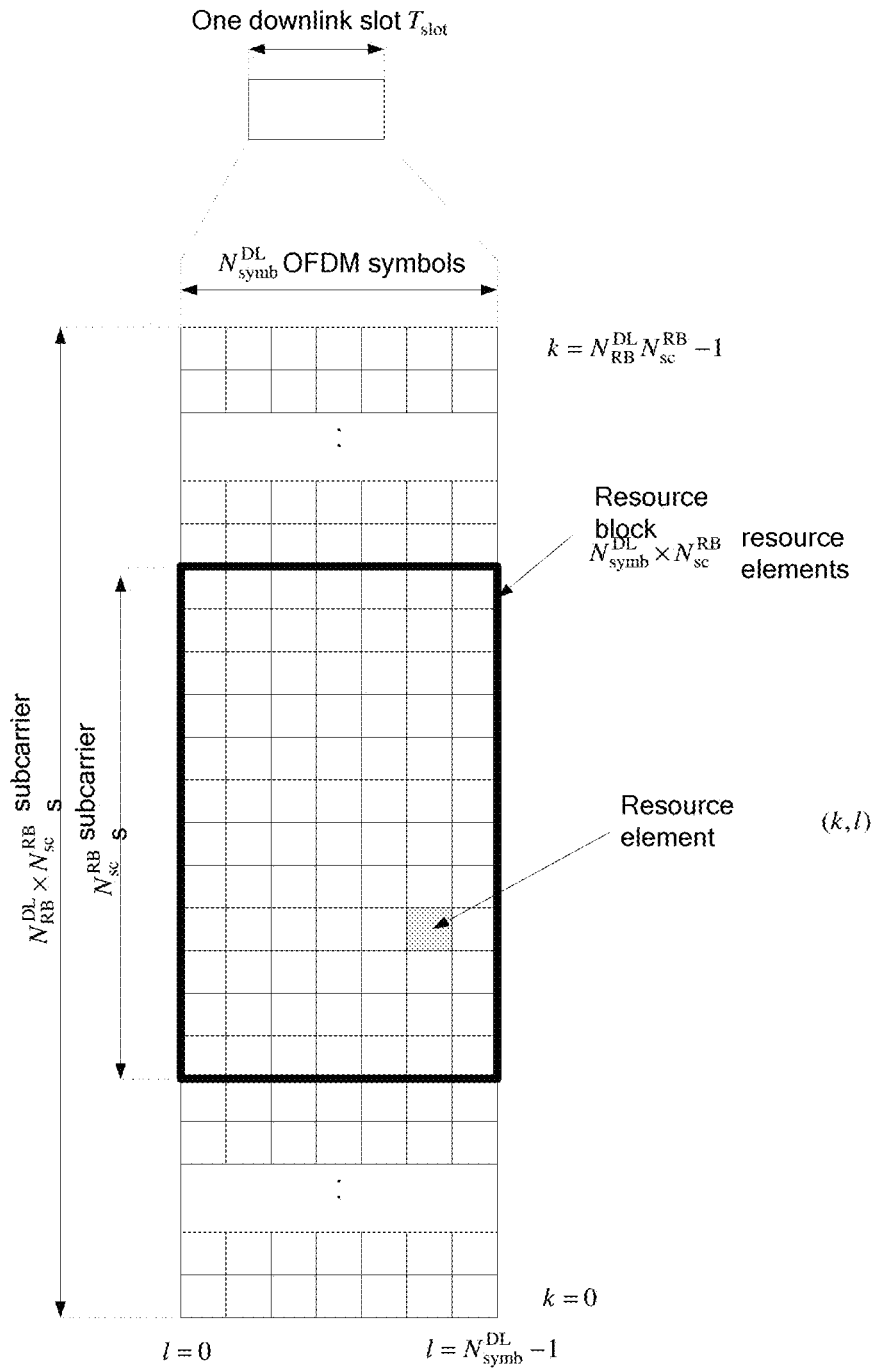
FIG. 7 is a reproduction of FIG. 6.2.2-1 of 3GPP TS 36.211.

Furthermore, each downlink slot includes $N_{symb}^{DL}$ OFDM (Orthogonal Frequency Division Multiplexing) symbols as shown in FIGS. 7 and 8. FIG. 7 is a reproduction of FIG. 6.2.2-1 of 3GPP TS 36.211. FIG. 8 is a reproduction of Table 6.2.3-1 of 3GPP TS 36.211.

LTE has several physical layer downlink control signaling. MasterInformationBlock (MIB) provides necessary system information, including downlink bandwidth, system frame number, and PHICH configuration for UEs in the cell, as discussed in 3GPP TS 36.331 as follows:

MasterInformationBlock

The MasterInformationBlock includes the system information transmitted on BCH.

Signalling radio bearer: N/A
RLC-SAP: TM
Logical channel: BCCH
Direction: E-UTRAN to UE

| MasterInformationBlock |  |
|---|---|
| -- ASN1START |  |
| MasterInformationBlock ::= | SEQUENCE { |
| dl-Bandwidth | ENUMERATED { |
|  | n6, n15, n25, n50, n75, n100} , |
| phich-Config | PHICH-Config, |
| systemFrameNumber | BIT STRING (SIZE (8)), |
| spare | BIT STRING (SIZE (10)) |
| } |  |
| -- ASN1STOP |  |

| MasterInformationBlock field descriptions |
|---|
| dl-Bandwidth |
| Parameter: transmission bandwidth configuration, $N_{RB}$ in downlink, see TS 36.101 [42, table 5.6-1]. n6 corresponds to 6 resource blocks, n15 to 15 resource blocks and so on. |
| systemFrameNumber |
| Defines the 8 most significant bits of the SFN. As indicated in TS 36.211 [21, 6.6.1], the 2 least significant bits of the SFN are acquired implicitly in the P-BCH decoding, i.e. timing of 40 ms P-BCH TTI indicates 2 least significant bits (within 40 ms P-BCH TTI, the first radio frame: 00, the second radio frame: 01, the third radio frame: 10, the last radio frame: 11). One value applies for all serving cells of a Cell Group (i.e. MCG or SCG). The associated functionality is common (i.e. not performed independently for each cell). |

MIB is carried by the first 4 symbols in the second slot of the first subframe in a radio frame, as discussed in 3GPP TS 36.211 as follows:

6.6.4 Mapping to Resource Elements

The block of complex-valued symbols $y^{(p)}(0), \ldots, y^{(p)}(M_{symb}-1)$ for each antenna port is transmitted during 4 consecutive radio frames starting in each radio frame fulfilling $n_f \bmod 4=0$ and shall be mapped in sequence starting with $y(0)$ to resource elements (k,l). The mapping to resource elements (k,l) not reserved for transmission of reference signals shall be in increasing order of first the index k, then the index l in slot 1 in subframe 0 and finally the radio frame number. The resource-element indices are given by $$k = \frac{N_{RB}^{DL} N_{sc}^{RB}}{2} - 36 + k', k' = 0, 1, \ldots, 71$$

$$l = 0, 1, \ldots, 3$$

where resource elements reserved for reference signals shall be excluded. The mapping operation shall assume cell-specific reference signals for antenna ports 0-3 being present irrespective of the actual configuration. The UE shall assume that the resource elements assumed to be reserved for reference signals in the mapping operation above but not used for transmission of reference signal are not available for PDSCH transmission. The UE shall not make any other assumptions about these resource elements.

Synchronization signals (e.g., PSS and SSS) in a cell are designed for UEs in the cell to obtain the downlink timing, i.e. the radio frame boundary and subframe boundary. PSS (Primary Synchronization Signal) and SSS (Secondary Synchronization Signal) are each carried by one symbol. For example, for FDD (Frequency Division Duplex) system, PSS is carried by the last symbol in slot 0 and 10, and SSS is carried by the second-last symbol in slot 0 and 10, where slot 0 and slot 10 are the first slot of the first subframe and that of the sixth subframe in a radio frame, as discussed in 3GPP TS 36.211 as follows:

6.11.1.2 Mapping to Resource Elements

The mapping of the sequence to resource elements depends on the frame structure. The UE shall not assume that the primary synchronization signal is transmitted on the same antenna port as any of the downlink reference signals. The UE shall not assume that any transmission instance of the primary synchronization signal is transmitted on the same antenna port, or ports, used for any other transmission instance of the primary synchronization signal.

The sequence d(n) shall be mapped to the resource elements according to $$a_{k,l} = d(n), n = 0, \ldots, 61$$

$$k = n - 31 + \frac{N_{RB}^{DL} N_{sc}^{RB}}{2}$$

For frame structure type 1, the primary synchronization signal shall be mapped to the last OFDM symbol in slots 0 and 10.

For frame structure type 2, the primary synchronization signal shall be mapped to the third OFDM symbol in subframes 1 and 6. Resource elements (k,l) in the OFDM symbols used for transmission of the primary synchronization signal where $$k = n - 31 + \frac{N_{RB}^{DL} N_{sc}^{RB}}{2}$$

$$n = -5, -4, \ldots, -1, 62, 63, \ldots 66$$

are reserved and not used for transmission of the primary synchronization signal.

6.11.2.2 Mapping to Resource Elements

The mapping of the sequence to resource elements depends on the frame structure. In a subframe for frame structure type 1 and in a half-frame for frame structure type 2, the same antenna port as for the primary synchronization signal shall be used for the secondary synchronization signal.

The sequence d(n) shall be mapped to resource elements according to $$a_{k,l} = d(n), n = 0, \ldots, 61$$

$$k = n - 31 + \frac{N_{RB}^{DL} N_{sc}^{RB}}{2}$$

$$l = \begin{cases} N_{symb}^{DL} - 2 & \text{in slots 0 and 10} \quad \text{for frame structure type 1} \\ N_{symb}^{DL} - 1 & \text{in slots 1 and 11} \quad \text{for frame structure type 2} \end{cases}$$

Resource elements (k,l) where $$k = n - 31 + \frac{N_{RB}^{DL} N_{sc}^{RB}}{2}$$

$$l = \begin{cases} N_{symb}^{DL} - 2 & \text{in slots 0 and 10} \quad \text{for frame structure type 1} \\ N_{symb}^{DL} - 1 & \text{in slots 1 and 11} \quad \text{for frame structure type 2} \end{cases}$$

$$n = -5, -4, \ldots, -1, 62, 63, \ldots 66$$

are reserved and not used for transmission of the secondary synchronization signal.

Cell-specific Reference Signal (CRS) is for UEs to measure downlink radio condition of the cell. The symbol carrying CRS depends on the number of CRS port. As an example, for a cell configured with two port CRS, CRS is carried by the first symbol and the third-last symbol in both slots of a subframe, as discussed in 3GPP TS 36.211 as follows:

6.10.1.2 Mapping to Resource Elements

The reference signal sequence $r_{l,n_s}(m)$ shall be mapped to complex-valued modulation symbols $a_{k,l}^{(p)}$ used as reference symbols for antenna port p in slot $n_s$ according to $$a_{k,l}^{(p)} = r_{l,n_s}(m')$$

where $$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

The variables v and $v_{shift}$ define the position in the frequency domain for the different reference signals where v is given by $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

The cell-specific frequency shift is given by $v_{shift} = N_{ID}^{cell} \bmod 6$.

Physical downlink control channel (PDCCH) signaling provides resource allocation of downlink or uplink transmission, e.g., on PDSCH (Physical Downlink Shared Channel) or PUSCH (Physical Uplink Shared Channel). PDCCH is carried by one or several symbols in the beginning of a subframe depending on the signaling on PCFICH (Physical Control Format Indicator Channel). For example, when PCFICH indicating the number of symbols used for PDCCH transmission in a subframe is 2, PDCCH is carried by the first two symbols of the subframe, as discussed in 3GPP TS 36.211 as follows:

6.8.5 Mapping to Resource Elements

The mapping to resource elements is defined by operations on quadruplets of complex-valued symbols. Let $z^{(p)}(i) = \langle y^{(p)}(4i), y^{(p)}(4i+1), y^{(p)}(4i+2), y^{(p)}(4i+3) \rangle$ denote symbol quadruplet i for antenna port p.

The block of quadruplets $z^{(p)}(0), \ldots, z^{(p)}(M_{quad}-1)$, where $M_{quad} = M_{symb}/4$, shall be permuted resulting in $w^{(p)}(0), \ldots, w^{(p)}(M_{quad}-1)$. The permutation shall be according to the sub-block interleaver in clause 5.1.4.2.1 of 3GPP TS 36.212 [3] with the following exceptions:

the input and output to the interleaver is defined by symbol quadruplets instead of bits interleaving is performed on symbol quadruplets instead of bits by substituting the terms "bit", "bits" and "bit sequence" in clause 5.1.4.2.1 of 3GPP TS 36.212 [3] by "symbol quadruplet", "symbol quadruplets" and "symbol-quadruplet sequence", respectively <NULL> elements at the output of the interleaver in 3GPP TS 36.212 [3] shall be removed when forming $w^{(p)}(0), \ldots, w^{(p)}(M_{quad}-1)$. Note that the removal of <NULL> elements does not affect any <NIL> elements inserted in clause 6.8.2.

The block of quadruplets $w^{(p)}(0), \ldots, w^{(p)}(M_{quad}-1)$ shall be cyclically shifted, resulting in $\overline{w}^{(p)}(0), \ldots, \overline{w}^{(p)}(M_{quad}-1)$ where $\overline{w}^{(p)}(i)=w^{(p)}((i+N_{ID}^{cell}) \bmod M_{quad})$.

Mapping of the block of quadruplets $\overline{w}^{(p)}(0), \ldots, \overline{w}^{(p)}(M_{quad}-1)$ is defined in terms of resource-element groups, specified in clause 6.2.4, according to steps 1-10 below:

1) Initialize m'=0 (resource-element group number)
2) Initialize k'=0
3) Initialize l'=0
4) If the resource element (k',l') represents a resource-element group and the resource-element group is not assigned to PCFICH or PHICH then perform step 5 and 6, else go to step 7
5) Map symbol-quadruplet $\overline{w}^{(p)}(m')$ to the resource-element group represented by (k',l') for each antenna port p
6) Increase m' by 1
7) Increase l' by 1
8) Repeat from step 4 if l'<L, where L corresponds to the number of OFDM symbols used for PDCCH transmission as indicated by the sequence transmitted on the PCFICH
9) Increase k' by 1
10) Repeat from step 3 if $k'<N_{RB}^{DL} \cdot N_{sc}^{RB}$ Physical Hybrid ARQ Indicator Channel (PHICH) carries HARQ (Hybrid Automatic Repeat reQuest) feedback in response to uplink transmissions. PHICH is carried by one or several symbols in the beginning of a subframe depending on the configured PHICH duration as well as the subframe type. For example, for the case of a non-MBSFN subframe of a FDD cell with extended PHICH duration configuration, the PHICH is carried by the first three symbols of the subframe, as discussed in 3GPP TS 36.211 as follows:

6.9.3 Mapping to Resource Elements

The sequence $\overline{y}^{(p)}(0), \ldots, \overline{y}^{(p)}(M_{symb}^{(0)}-1)$ for each of the PHICH groups is defined by $$\overline{y}^{(p)}(n) = \Sigma y_i^{(p)}(n)$$

where the sum is over all PHICHs in the PHICH group and $y_i^{(p)}(n)$ represents the symbol sequence from the i:th PHICH in the PHICH group.

PHICH groups are mapped to PHICH mapping units.

For normal cyclic prefix, the mapping of PHICH group m to PHICH mapping unit m' is defined by $$\tilde{y}_{m'}^{(p)}(n) = \overline{y}_m^{(p)}(n)$$

where $$m' = m = \begin{cases} 0, 1, \ldots, N_{PHICH}^{group}-1 & \text{for frame structure type 1} \\ 0, 1, \ldots, m_i \cdot N_{PHICH}^{group}-1 & \text{for frame structure type 2} \end{cases},$$

and where $m_i$ is given by Table 6.9-1.

For extended cyclic prefix, the mapping of PHICH group m and m+1 to PHICH mapping unit m' is defined by $$\tilde{y}_{m'}^{(p)}(n) = \overline{y}_m^{(p)}(n) + \overline{y}_{m+1}^{(p)}(n)$$

where $$m' = m/2$$

$$m = \begin{cases} 0, 2, \ldots, N_{PHICH}^{group}-2 & \text{for frame structure type 1} \\ 0, 2, \ldots, m_i \cdot N_{PHICH}^{group}-2 & \text{for frame structure type 2} \end{cases}$$

and where $m_i$ is given by Table 6.9-1.

Let $z^{(p)}(i) = \langle \tilde{y}^{(p)}(4i), \tilde{y}^{(p)}(4i+1), \tilde{y}^{(p)}(4i+2), \tilde{y}^{(p)}(4i+3) \rangle$, i=0, 1, 2 denote symbol quadruplet i for antenna port p. Mapping to resource elements is defined in terms of symbol quadruplets according to steps 1-10 below:

1) For each value of l'
2) Let $n_{l'}$ denote the number of resource element groups not assigned to PCFICH in OFDM symbol l'
3) Number the resource-element groups not assigned to PCFICH in OFDM symbol l' from 0 to $n_{l'}-1$, starting from the resource-element group with the lowest frequency-domain index.
4) Initialize m'=0 (PHICH mapping unit number)
5) For each value of i=0, 1, 2
6) Symbol-quadruplet $z^{(p)}(i)$ from PHICH mapping unit m' is mapped to the resource-element group represented by $(k',l')_i$ as defined in clause 6.2.4 where the indices $k'_i$ and $l'_i$ are given by steps 7 and 8 below:
7) The time-domain index $l'_i$ is given by $$l'_i = \begin{cases} 0 & \text{normal } PHICH \text{ duration, all subframes} \\ (\lfloor m'/2 \rfloor + i + 1) \bmod 2 & \text{extended } PHICH \text{ duration, MBSFN subframes} \\ (\lfloor m'/2 \rfloor + i + 1) \bmod 2 & \text{extended } PHICH \text{ duration, subframe 1 and 6 in frame structure type 2} \\ i & \text{otherwise} \end{cases}$$

8) Set the frequency-domain index $k'_i$ to the resource-element group assigned the number $\overline{n}_i$ in step 3 above, where $\overline{n}_i$ is given by $$\overline{n}_i = \begin{cases} (\lfloor N_{ID}^{cell} \cdot n_{l'_i}/n_1 \rfloor + m') \bmod n_{l'_i} & i = 0 \\ (\lfloor N_{ID}^{cell} \cdot n_{l'_i}/n_1 \rfloor + m' + \lfloor n_{l'_i}/3 \rfloor) \bmod n_{l'_i} & i = 1 \\ (\lfloor N_{ID}^{cell} \cdot n_{l'_i}/n_1 \rfloor + m' + \lfloor 2n_{l'_i}/3 \rfloor) \bmod n_{l'_i} & i = 2 \end{cases}$$

in case of extended PHICH duration in MBSFN subframes, or extended PHICH duration in subframes 1 and 6 for frame structure type 2 and by $$\overline{n}_i = \begin{cases} (\lfloor N_{ID}^{cell} \cdot n_{l'_i}/n_0 \rfloor + m') \bmod n_{l'_i} & i = 0 \\ (\lfloor N_{ID}^{cell} \cdot n_{l'_i}/n_0 \rfloor + m' + \lfloor n_{l'_i}/3 \rfloor) \bmod n_{l'_i} & i = 1 \\ (\lfloor N_{ID}^{cell} \cdot n_{l'_i}/n_0 \rfloor + m' + \lfloor 2n_{l'_i}/3 \rfloor) \bmod n_{l'_i} & i = 2 \end{cases}$$

otherwise.
9) Increase m' by 1.
10) Repeat from step 5 until all PHICH mapping units have been assigned.

The PHICH duration is configurable by higher layers according to Table 6.9.3-1 [which is reproduced as FIG. 9 of the present application].

Demodulation Reference Signal (DMRS) is the reference signal to help UE(s) demodulate EPDCCH (Enhanced Physical Downlink Control Channel) or PDSCH. DMRS is carried by four symbols in a subframe while the location of the four symbols depends on cyclic-prefix (CP) length and subframe type. As an example, for the case of FDD cell with normal CP, DMRS is carried by the last two symbols of both slots in a subframe, as discussed in 3GPP TS 36.211:

6.10.3.2 Mapping to Resource Elements

For antenna ports p=7, p=8 or p=7, 8, . . . , v+6, in a physical resource block with frequency-domain index $n_{PRB}$ assigned for the corresponding PDSCH transmission, a part of the reference signal sequence r(m) shall be mapped to complex-valued modulation symbols $a_{k,l}^{(p)}$ in a subframe according to Normal Cyclic Prefix:

$$a_{k,l}^{(p)} w_p(l') \cdot r(3 \cdot l' \cdot N_{RB}^{max,DL} + 3 \cdot n_{PRB} + m')$$

where $$w_p(i) = \begin{cases} \bar{w}_p(i) & (m' + n_{PRB}) \bmod 2 = 0 \\ \bar{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$l =$ $$\begin{cases} l' \bmod 2 + 2 & \text{if in a special subframe with configuration 3, 4, 8 or 9(see Table 4.2-1)} \\ l' \bmod 2 + 2 + 3\lfloor l'/2 \rfloor & \text{if in a special subframe with configuration 1, 2, 6 or 7(see Table 4.2-1)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in } a \text{ special subframe} \\ & \text{with configuration 1, 2, 6 or 7(see Table 4.2-1)} \\ 0, 1 & \text{if } n_s \bmod 2 = 0 \text{ and not in special subframe} \\ & \text{with configuration 1, 2, 6 or 7(see Table 4.2-1)} \\ 2, 3 & \text{if } n_s \bmod 2 = 1 \text{ and not in special subframe} \\ & \text{with configuration 1, 2, 6 or 7(see Table 4.2-1)} \end{cases}$$

$$m' = 0, 1, 2$$

The sequence $\bar{w}_p(i)$ is given by Table 6.10.3.2-1 [which is reproduced as FIG. 10 of the present application].

Extended Cyclic Prefix:

$$a_{k,l}^{(p)} = w_p(l' \bmod 2) \cdot r(4 \cdot l' \cdot N_{RB}^{max,DL} + 4 \cdot n_{PRB} + m')$$

where $$w_p(i) = \begin{cases} \bar{w}_p(i) & m' \bmod 2 = 0 \\ \bar{w}_p(1-i) & m' \bmod 2 = 1 \end{cases}$$

$$k = 3m' + N_{sc}^{RB} n_{PRB} + k'$$

$$k' = \begin{cases} 1 & \text{if } n_s \bmod 2 = 0 \text{ and } p \in \{7, 8\} \\ 2 & \text{if } n_s \bmod 2 = 1 \text{ and } p \in \{7, 8\} \end{cases}$$

$$l = l' \bmod 2 + 4$$

$$l' = \begin{cases} 0, 1 & \text{if } n_s \bmod 2 = 0 \text{ and in } a \text{ special subframe} \\ & \text{with configuration 1, 2, 3, 5 or 6(see Table 4.2-1)} \\ 0, 1 & \text{if } n_s \bmod 2 = 0 \text{ and not in special subframe} \\ 2, 3 & \text{if } n_s \bmod 2 = 1 \text{ and not in special subframe} \end{cases}$$

$$m' = 0, 1, 2, 3$$

The sequence $\bar{w}_p(i)$ is given by Table 6.10.3.2-2 [which is reproduced as FIG. 11 of the present invention.

For extended cyclic prefix, UE-specific reference signals are not supported on antenna ports 9 to 14.

Resource elements (k,l) used for transmission of UE-specific reference signals to one UE on any of the antenna ports in the set s, where s={7, 8, 11, 13} or s={9, 10, 12, 14} shall
 not be used for transmission of PDSCH on any antenna port in the same slot, and
 not be used for UE-specific reference signals to the same UE on any antenna port other than those in s in the same slot.

As for downlink data in LTE, it is transmitted on PDSCH and carried by symbols excluding the first or first several symbols of a subframe, i.e. excluding the symbols which are (maybe) occupied by the physical control channels, as mentioned above and discussed in 3GPP TS 36.211 as follows:

6.4 Physical Downlink Shared Channel

The physical downlink shared channel shall be processed and mapped to resource elements as described in clause 6.3 with the following additions and exceptions:
 In resource blocks in which UE-specific reference signals are not transmitted, the PDSCH shall be transmitted on the same set of antenna ports as the PBCH, which is one of {0}, {0, 1}, or {0, 1, 2, 3}.
 In resource blocks in which UE-specific reference signals are transmitted, the PDSCH shall be transmitted on antenna port(s) {5}, {7}, {8}, or p∈{7, 8, . . . , v+6}, where v is the number of layers used for transmission of the PDSCH.
 If PDSCH is transmitted in MBSFN subframes as defined in 3GPP TS 36.213 [4], the PDSCH shall be transmitted on one or several of antenna port(s) p∈{7, 8, . . . , v+6}, where v is the number of layers used for transmission of the PDSCH.
 PDSCH is not mapped to resource elements used for UE-specific reference signals associated with PDSCH
 In mapping to resource elements, the positions of the cell-specific reference signals are given by clause 6.10.1.2 with the number of antenna ports and the frequency shift of the cell-specific reference signals derived as described in clause 6.10.1.2, unless other values for these parameters are provided by clause 7.1.9 in 3GPP TS 36.213 [4], in which case these values are used in the resource blocks indicated by the relevant DCI.

If the DCI associated with the PDSCH uses the C-RNTI or semi-persistent C-RNTI, the PDSCH is not mapped to resource elements assumed by the UE to be used for transmission of:
  zero-power CSI reference signals, where the positions of the CSI reference signals are given by clause 6.10.5.2. The configuration for zero power CSI reference signals is
    obtained as described in clause 6.10.5.2, unless other values for these parameters are provided by clause 7.1.9 in 3GPP TS 36.213 [4], in which case these values are used in the resource blocks indicated by the relevant DCI, and
    obtained by higher-layer configuration of up to five reserved CSI-RS resources as part of the discovery signal configuration following the procedure for zero-power CSI-RS in clause 6.10.5.2.
  non-zero-power CSI reference signals for CSI reporting, where the positions of the non-zero-power CSI reference signals for CSI reporting are given by clause 6.10.5.2. The configuration for non-zero power CSI reference signals is obtained as described in clause 6.10.5.2.
PDSCH is not mapped to any physical resource-block pair(s) carrying an EPDCCH associated with the PDSCH.
The index l in the first slot in a subframe fulfils $l \geq l_{DataStart}$ where $l_{DataStart}$ is given by clause 7.1.6.4 of 3GPP TS 36.213 [4].
In mapping to resource elements, if the DCI associated with the PDSCH uses the C-RNTI or semi-persistent C-RNTI and transmit diversity according to clause 6.3.4.3 is used, resource elements in an OFDM symbol assumed by the UE to contain CSI-RS shall be used in the mapping if and only if all of the following criteria are fulfilled:
  there is an even number of resource elements for the OFDM symbol in each resource block assigned for transmission, and
  the complex-valued symbols $y^{(p)}(i)$ and $y^{(p)}(i+1)$, where i is an even number, can be mapped to resource elements (k,l) and (k+n,l) in the same OFDM symbol with n<3.

The concept of radio access for 5G is discussed in the DOCOMO 5G White Paper. One key point is to efficiently integrate both lower and higher frequency bands. Higher frequency bands provide opportunities for wider spectrum but have coverage limitations because of higher path loss. The DOCOMO 5G White Paper proposes that the 5G system has a two-layer structure that consists of a coverage layer (e.g., consisting of macro cell(s)) and a capacity layer (e.g., consisting of small cell(s) or phantom cell(s)). The coverage layer uses existing lower frequency bands to provide basic coverage and mobility. The capacity layer uses new higher frequency bands to provide high data rate transmission. The coverage layer could be supported by enhanced LTE RAT while the capacity layer could be supported by a new RAT dedicated to higher frequency bands. The efficient integration of the coverage and capacity layers is enabled by the tight interworking (dual connectivity) between the enhanced LTE RAT and the new RAT. In addition, a cell in 5G may contain a single transmission point (TP)/transmission and reception point (TRP) or multiple TPs/TRPs and a network node (e.g., eNB) communicates with UEs in the cell via these TPs/TRPs.

As discussed in 3GPP TS 36.300, dual connectivity is a mode of operation of a UE in RRC_CONNECTED, configured with a Master Cell Group (i.e., a group of serving cells associated with the MeNB (Master eNB), comprising of the PCell and optionally one or more SCells) and a Secondary Cell Group (i.e., a group of serving cells associated with the SeNB (Secondary eNB), comprising of PSCell (Primary Secondary Cell) and optionally one or more SCells). A UE configured with dual connectivity generally means that the UE is configured to utilize radio resources provided by two distinct schedulers, located in two eNBs (MeNB and SeNB) connected via a non-ideal backhaul over the X2 interface. Further details of dual connectivity can be found in 3GPP TS 36.300.

In dual connectivity, the random access procedure is also performed on at least PSCell upon SCG (Secondary Cell Group) addition/modification (if instructed), upon DL data arrival during RRC_CONNECTED requiring random access procedure (e.g., when UL synchronisation status is non-synchronized), or upon UL data arrival during RRC_CONNECTED requiring random access procedure (e.g., when UL synchronization status is non-synchronized or there are no available PUCCH (Physical Uplink Control Channel) resources for SR. The UE-initiated random access procedure is performed only on PSCell for SCG.

Figure 12:
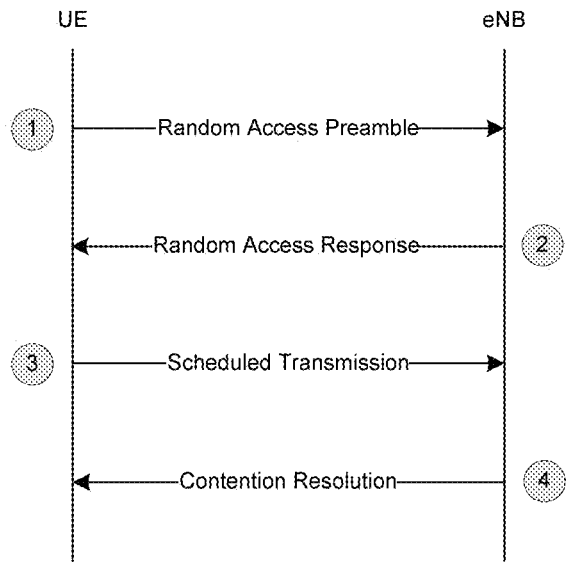
FIG. 12 is a reproduction of FIG. 10.1.5.1-1 of 3GPP TS 36.300.

The random access procedure has two different types: contention-based and non-contention based. The contention based random access procedure is shown in FIG. 12, which is a reproduction of FIG. 10.1.5.1-1 of 3GPP TS 36.300. FIG. 12 includes the following four steps:
1. Random Access Preamble on RACH (Random Access Channel) mapped to PRACH (Physical Random Access Channel) in uplink
2. Random Access Response generated by MAC (Medium Access Channel) on DL-SCH (Downlink Shared Channel)
3. First scheduled UL (Uplink) transmission on UL-SCH (Uplink Shared Channel)
4. Contention Resolution on DL.

Figure 13:
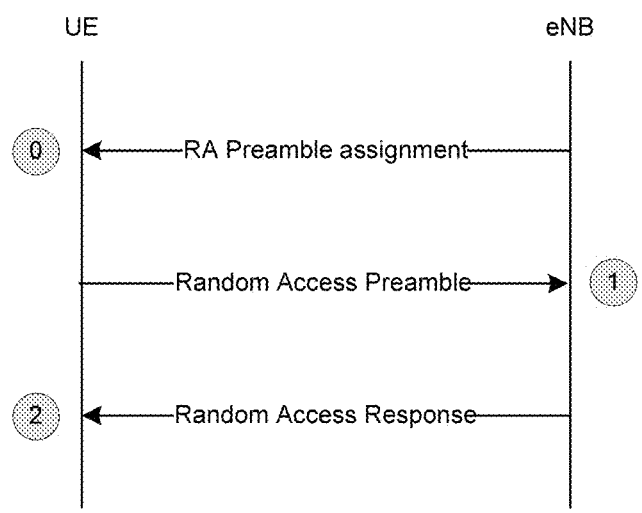
FIG. 13 is a reproduction of FIG. 10.1.5.2-1 of 3GPP TS 36.300.

The non-contention based random access procedure is shown in FIG. 13, which is a reproduction of FIG. 10.1.5.2-1 of 3GPP TS 36.300. FIG. 13 includes the following three steps:
0. Dedicated Random Access Preamble assignment via dedicated signalling in DL
1. Non-contention Random Access Preamble on RACH mapped to PRACH in uplink
2. Random Access Response on DL-SCH Details of each step in a random access procedure can be found in 3GPP TS 36.300 and 36.321.

Figure 14:
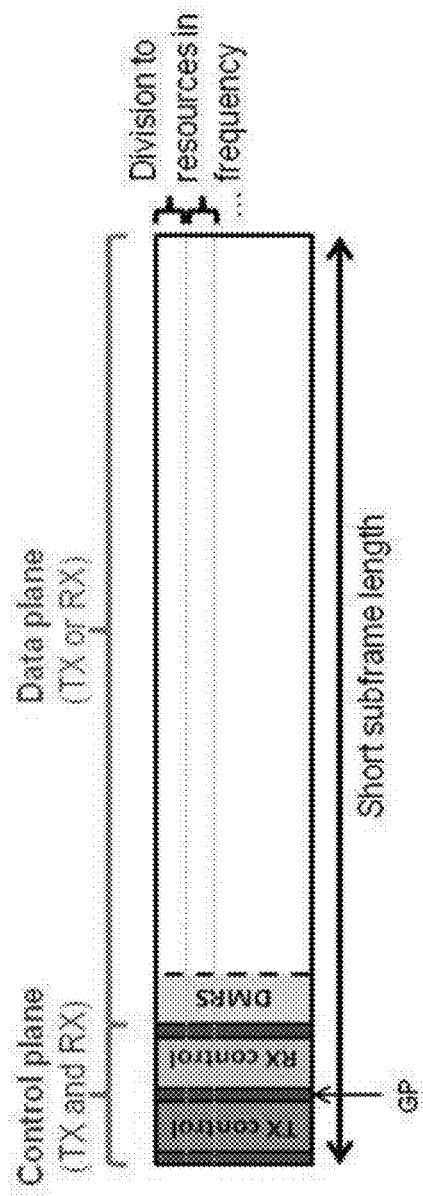
FIG. 14 is a reproduction of FIG. 3-2 of METIS Deliverable D2.4.

Regarding frame structure for the next generation radio access technology, a TDD optimized physical subframe structure for a UDN system proposed by METIS Deliverable D2.4 is illustrated in FIG. 14, following these main design principles:
  A bi-directional (including both DL and UL resources) control part is embedded to the beginning of each subframe and time-separated from data part.
  Data part in one subframe contains data symbols for either transmission or reception. Demodulation reference signal (DMRS) symbols, which used to estimate the channel and its covariance matrix, could be located in the first OFDM symbol in the dynamic data part and could be precoded with the same vector/matrix as data.
  Short subframe lengths (e.g., 0.25 ms on cmW frequencies when assuming 60 kHz SC spacing) are feasible. By following the principles of harmonized OFDM concept, the frame numerology is further scaled when moving to mmW, leading to even shorter frame length (e.g., in the order of 50 µs).

In frequency direction, the spectrum can be divided to separate allocable frequency resources.

Furthermore, cells on the capacity layer may use beamforming. Beamforming is generally a signal processing technique used in antenna arrays for directional signal transmission or reception. This is achieved by combining elements in a phased array in such a way that signals at particular angles experience constructive interference while others experience destructive interference. Beamforming could be used at both the transmitting and receiving ends to achieve spatial selectivity. The improvement compared with omnidirectional reception/transmission is known as the receive/transmit gain.

Beamforming is frequently applied in radar systems. The beam created by a phased array radar is comparatively narrow and highly agile compared to a moving dish. This characteristic gives the radar the ability to detect small, fast targets like ballistic missiles in addition to aircrafts.

The benefit of co-channel interference reduction also makes beamforming attractive to a mobile communication system designer. U.S. Provisional Application Ser. No. 62/107,814, entitled "Method and Apparatus for Beam Tracking in a Wireless Communication System", generally discloses the concept of beam division multiple access (BDMA) based on beamforming technique. In BDMA, a base station could communicate with a mobile device via a narrow beam to obtain the receive/transmit gain. Furthermore, two mobile devices in different beams could share the same radio resources at the same time; and thus the capacity of a mobile communication system can increase greatly. To achieve that, the base station should know in which beam a mobile device is located.

A cell, transmission point (TP), or transmission and reception point (TRP) could use beamforming for directional signal transmission or reception. Due to power saving or hardware limitation (e.g., insufficient number of transceivers), the cell, TP, or TRP may not be able to generate all beams to cover all directions within the coverage of the cell, TP, or TRP. In other words, the cell, TP, or TRP may generate part of the beams for directional signal transmission or reception at a time. For example, the maximum number of beams which can be generated by a cell, TP, or TRP at one time could be less than the total number of beams in the cell or the total number of beams of the TP or TRP. At the same time, directional signal transmission or reception on other non-generated beams would be impossible. Thus, it would take multiple times for a cell, TP, or TRP to scan all beams of the cell, TP, or TRP.

The downlink control signaling can generally be categorized into 2 types:

Type 1—Common signaling (transmitted periodically) intended for all or plurality of UEs in the cell or UEs connecting to the TP or TRP (e.g., system information, PSS/SSS, CRS, control signaling for broadcast message, etc.)

Type 2:—UE specific signaling (transmitted dynamically or periodically), e.g., PDCCH, PHICH, DMRS, etc.

If the cell, TP, or TRP has limitation of beam generation as described above, it is assumed that type 1 signaling is transmitted on predefined beams in a specific timing (e.g., subframe(s) or symbol(s)). As a result, transmissions (e.g., type 2 control signaling or data) to UEs not covered by the predefined beams in the same specific timing would be impossible. Then, network scheduling flexibility is limited. Designing a frame structure to improve network scheduling flexibility should be considered.

Communication between a network node and a UE could be organized into frames. A frame could contain multiple subframes. A subframe could contain multiple symbols. A subframe could contain a downlink control region which contains one or multiple symbols and is used to carry control signaling.

Figure 15:
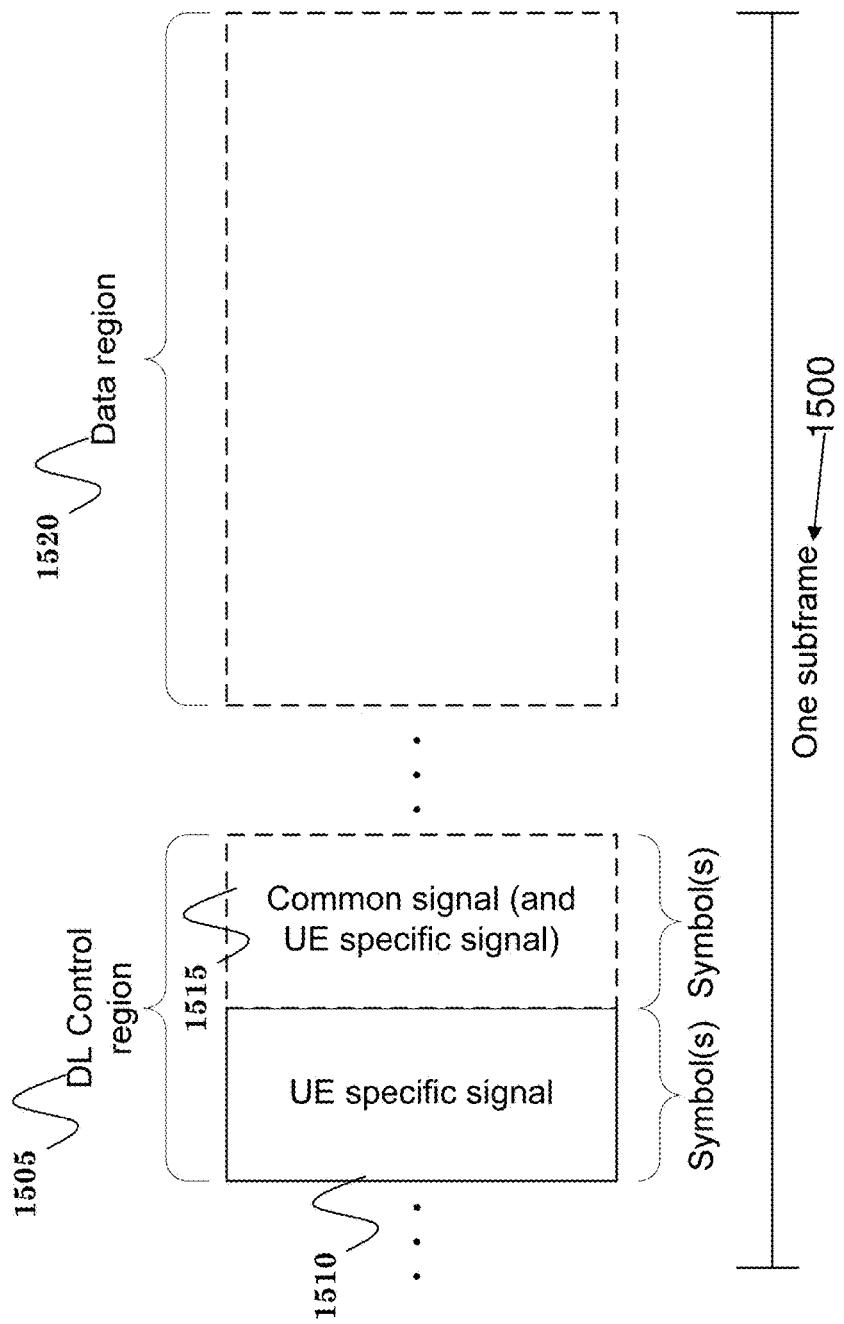
FIG. 15 is a diagram of a subframe according to one exemplary embodiment.

FIG. 15 is a diagram of a subframe 1500 in according with one exemplary embodiment. In general, the concept of the invention is that in downlink control region 1505 of a subframe, there is at least a first part of the downlink control region (e.g., consisting of at least one symbol) used to transmit UE specific downlink control signaling (e.g., type 2) 1510, and not used to transmit common downlink control signaling (e.g., type 1). Then, the network could flexibly use the first part of downlink control region to transmit signaling on beam(s) of certain UE(s), and is not limited by the beams for type 1 signaling.

In addition, there could be a second part of the downlink control region (e.g., consisting of at least one symbol) used to transmit common downlink control signaling (e.g., type 1) 1515. The second part could also be used to transmit UE specific downlink control signaling (e.g., type 2) if the associated UE is covered by predefined beams used for transmitting the type 1 signaling. Alternatively, the second part could not be used to transmit UE specific downlink control signaling (e.g., type 2). The subframe 1500 could also include a data region 1520.

Furthermore, the UE specific downlink control signaling (e.g., for one specific UE) could include at least one of the following signals or signalings:

A signaling (e.g., on PDCCH) to allocate resource for a DL or UL transmission;

A signaling (e.g., on PHICH) to carry HARQ feedback in response to at least one UL transmission; and/or A reference signal used to help an UE demodulate a DL transmission (e.g., DMRS).

In addition, the common downlink control signaling (e.g., for multiple UEs) could include at least one of the following signals or signalings:

A signaling indicating system frame number of the cell, TP, or TRP;

A signaling (e.g., on PDCCH) allocate resource for a broadcast message (e.g., system information, paging, random access response) for UE(s) in the cell or for UE(s) connecting to the TP or TRP;

A synchronization signal for UE(s) in the cell or for UE(s) connecting to the TP or TRP to obtain downlink timing; and/or A reference signal for UE(s) to measure downlink radio condition (e.g., CRS).

Also, every subframe with downlink control region could contain the first part and the second part. In one embodiment, beam(s) of the cell, TP, or TRP generated in the first part would be different from beam(s) of the cell, TP, or TRP generated in the second part.

In addition, the general concept of the invention could be applied to the LTE frame structure (discussed in 3GPP TS 36.300). Alternatively, the concept could be applied to the METIS frame structure (discussed in METIS Deliverable D2.4).

Another general concept of the invention is that in downlink control region of a subframe, there is at least a first part of the downlink control region (e.g., consisting of at least one symbol) and a second part of the downlink control region (e.g., consisting of at least one symbol), wherein beam(s) of the cell, TP, or TRP generated in the first part is completely or partially different from beam(s) of the cell, TP, or TRP generated in the second part.

In one embodiment, the first part could be used to transmit the common downlink control signaling (e.g., type 1) and/or the UE specific downlink control signaling (e.g., type 2). Similarly, the second part could be used to transmit the common downlink control signaling (e.g., type 1) and/or the UE specific downlink control signaling (e.g., type 2).

In one embodiment, the subframe could contain a data region for UL, a data region for DL, and/or an uplink control region. The data region could also contain symbols, wherein beam(s) of the cell, TP, or TRP generated in different symbols is completely or partially different.

Furthermore, a signaling transmitted in the first part of the downlink control region of the subframe could be associated with resources in first symbol(s) of the data region in the subframe; and a signaling transmitted in the second part of the downlink control region of the subframe could be associated with resources in second symbol(s) of the data region in the subframe. The first symbol(s) and the second symbol(s) are completely or partially different.

In addition, the common downlink control signaling in the first part and the common downlink control signaling in the second part could be synchronization signals with different sequences. The UE could detect the subframe boundary according to the sequence used by the synchronization signals.

Also, the common downlink control signaling in the first part and the common downlink control signaling in the second part could be synchronization signals on different frequency resources. The UE could detect the subframe boundary according to the frequency resources used by the synchronization signals.

Also, the common downlink control signaling in the first part and the common downlink control signaling in the second part could be transmitted on different frequency resources.

Figure 16:
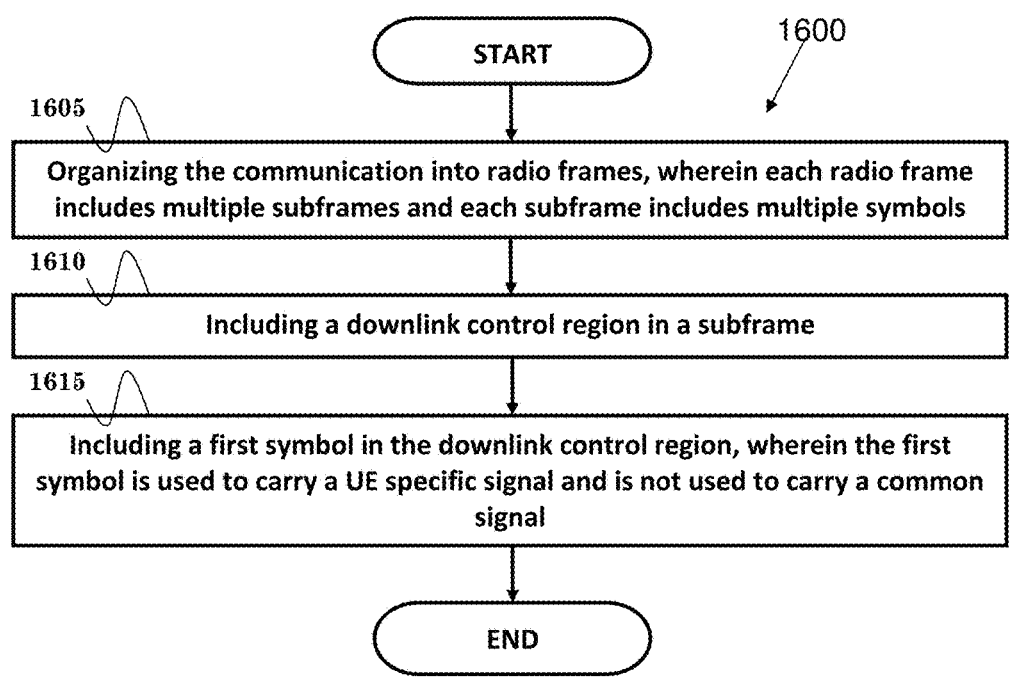
FIG. 16 is a flow chart according to one exemplary embodiment.

FIG. 16 is a flow chart 1600 for defining a communication between a cell, TP, or TRP and a UE in accordance with one exemplary embodiment. In step 1605, the communication is organized into radio frames, wherein each radio frame includes multiple subframes and each subframe includes multiple symbols. In step 1610, a downlink control region is included in a subframe. In step 1615, a first symbol is included in the downlink control region, wherein the first symbol is used to carry a UE specific signal and is not used to carry a common signal.

In one embodiment, the downlink control region could include a second symbol, wherein the second symbol is used to carry the common signal. Furthermore, the second symbol is used to carry the UE specific signal. Alternatively, the second symbol is not used to carry the UE specific signal.

Referring back to FIGS. 3 and 4, in one exemplary embodiment for defining a communication between a cell, TP, or TRP and a UE, the device 300 includes a program code 312 stored in the memory 310. The CPU 308 could execute program code 312 (i) to organize the communication into radio frames, wherein each radio frame includes multiple subframes and each subframe includes multiple symbols, (ii) to include a downlink control region in a subframe, and (iii) to include a first symbol in the downlink control region, wherein the first symbol is used to carry a UE specific signal and is not used to carry a common signal. Furthermore, the CPU 308 can execute the program code 312 to perform all of the above-described actions and steps or others described herein.

Figure 17:
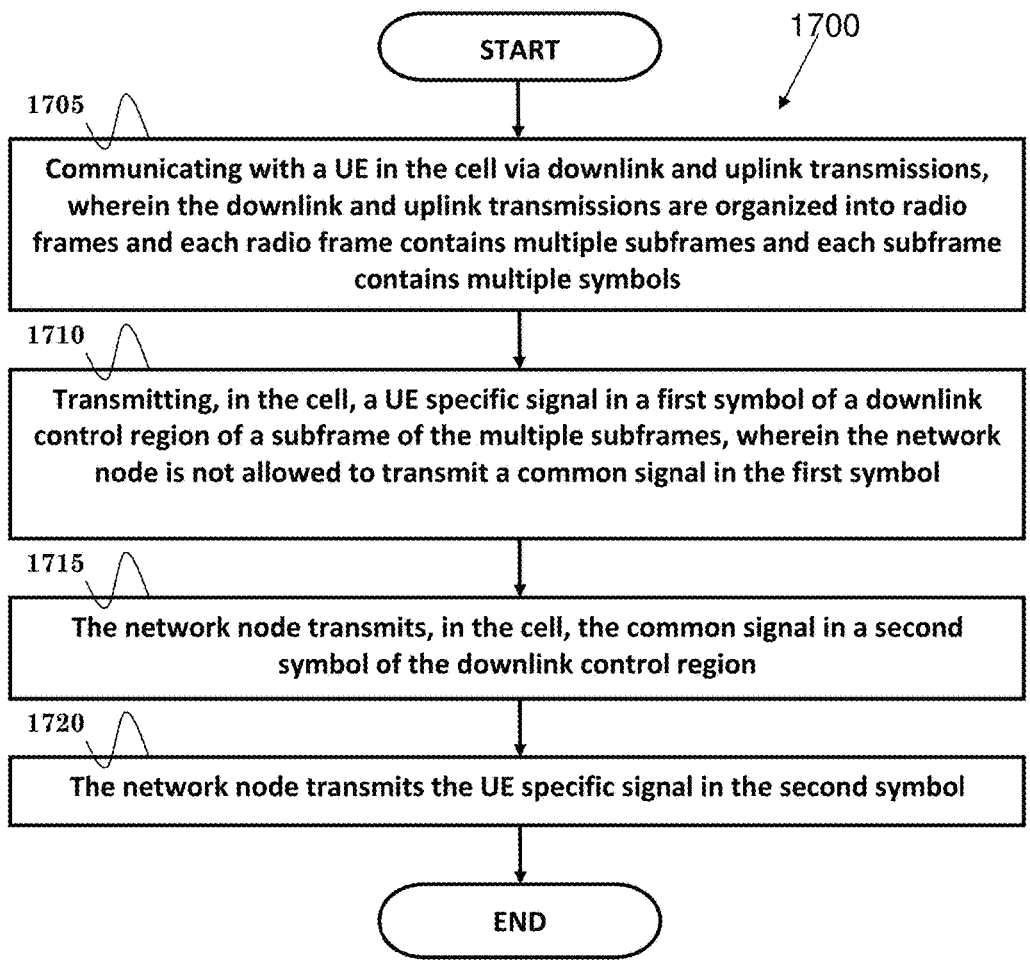
FIG. 17 is a flow chart according to one exemplary embodiment.

FIG. 17 is a flow chart 1700 from the perspective of a network node controlling a cell, TP, or TRP in accordance with one exemplary embodiment. Step 1705 includes communicating with a UE in the cell via downlink and uplink transmissions, wherein the downlink and uplink transmissions are organized into radio frames and each radio frame contains multiple subframes and each subframe contains multiple symbols. Step 1710 includes transmitting, in the cell, a UE specific signal in a first symbol of a downlink control region of a subframe of the multiple subframes, wherein the network node is not allowed to transmit a common signal in the first symbol.

In one embodiment, as shown in step 1715, the network node transmits, in the cell, the common signal in a second symbol of the downlink control region. Furthermore, as shown in step 1720, the network node transmits the UE specific signal in the second symbol. Alternatively, the network node is not allowed to transmit the UE specific signal in the second symbol.

Referring back to FIGS. 3 and 4, in one embodiment from the perspective of a network node controlling a cell, TP, or TRP, the device 300 includes a program code 312 stored in memory 310. The CPU 308 could execute program code 312 to enable the network node (i) to communicate with a UE in the cell via downlink and uplink transmissions, wherein the downlink and uplink transmissions are organized into radio frames and each radio frame contains multiple subframes and each subframe contains multiple symbols, and (ii) to transmit, in the cell, a UE specific signal in a first symbol of a downlink control region of a subframe of the multiple subframes, wherein the network node is not allowed to transmit a common signal in the first symbol. In one embodiment, the CPU could further execute program code 312 to enable the network node (i) to transmits, in the cell, the common signal in a second symbol of the downlink control region, and/or (ii) to transmit the UE specific signal in the second symbol. Furthermore, the CPU 308 can execute the program code 312 to perform all of the above-described actions and steps or others described herein.

Figure 18:
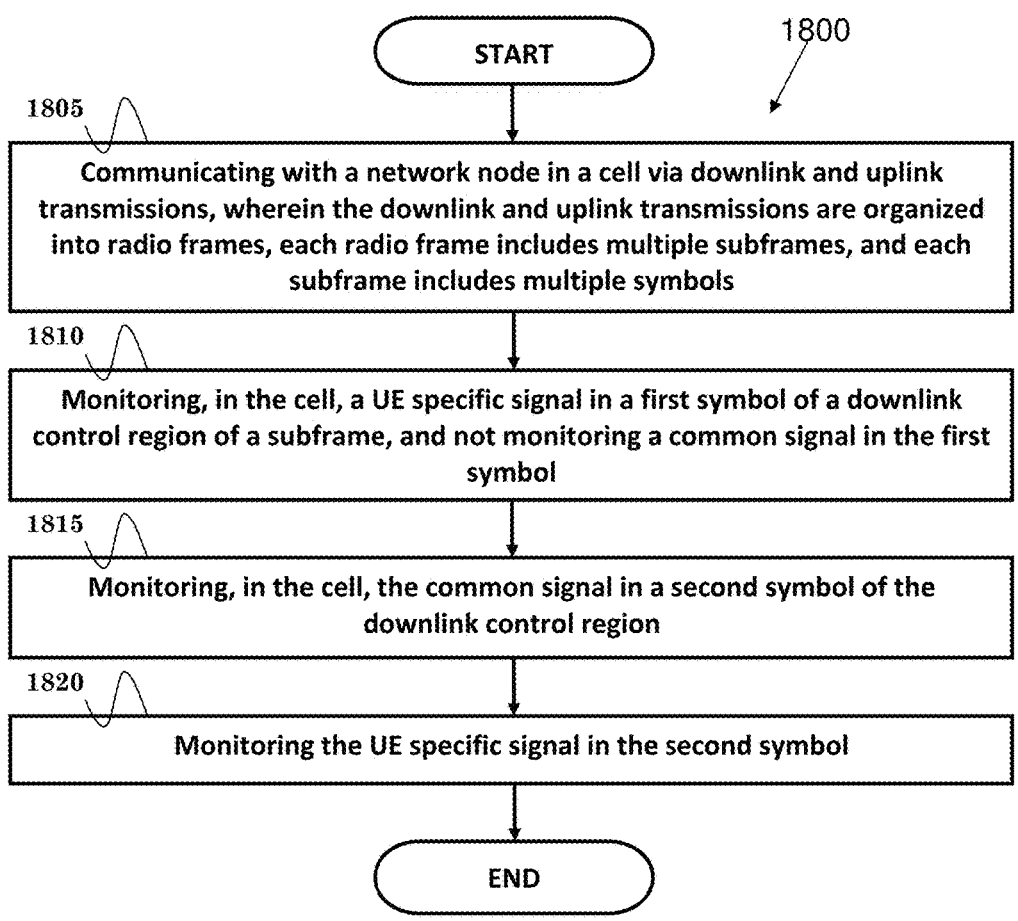
FIG. 18 is a flow chart according to one exemplary embodiment.

FIG. 18 is a flow chart 1800 in accordance with one exemplary embodiment from the perspective of a UE. In step 1805, the UE communicates with a network node in a cell via downlink and uplink transmissions, wherein the downlink and uplink transmissions are organized into radio frames, each radio frame includes multiple subframes, and each subframe includes multiple symbols. In step 1810, the UE monitors, in the cell, a UE specific signal in a first symbol of a downlink control region of a subframe, and not monitoring a common signal in the first symbol.

In one embodiment, as shown in step 1815, the UE could monitor, in the cell, the common signal in a second symbol of the downlink control region. Furthermore, as shown in step 1820, the UE could monitor the UE specific signal in the second symbol. Alternatively, the UE does not monitor the UE specific signal in the second symbol.

Referring back to FIGS. 3 and 4, in one embodiment from the perspective of a UE, the device 300 includes a program code 312 stored in memory 310 of the transmitter. The CPU 308 could execute program code 312 to enable the UE (i) to communicate with a network node in a cell via downlink and uplink transmissions, wherein the downlink and uplink transmissions are organized into radio frames, each radio frame includes multiple subframes, and each subframe includes multiple symbols, and (ii) to monitor, in the cell, a UE specific signal in a first symbol of a downlink control region of a subframe, and not monitoring a common signal in the first symbol. In one embodiment, the CPU could further execute program code 312 to enable the network node (i) to monitor, in the cell, the common signal in a second symbol of the downlink control region, and/or (ii) to monitor the UE specific signal in the second symbol. In addition, the CPU 308 can execute the program code 312 to perform all of the above-described actions and steps or others described herein.

With respect to the various embodiments disclosed and discussed, the subframe could include a data region for UL, a data region for DL, and/or an UL control region in one embodiment. Besides, the network node could be a base station.

Furthermore, in one embodiment, the UE specific signal could be for one specific UE. In addition, the UE specific signal could be transmitted on beam(s) of the cell, TP, or TRP corresponding to the UE. Also, the UE specific signal could be a signaling indicating resource allocation (e.g., PDCCH), a signaling indicating HARQ feedback (e.g., PHICH—"Physical Hybrid ARQ Indicator Channel"), and/or a reference signal for demodulation (e.g., DMRS). Furthermore, the UE specific signal could be associated with a UE specific reference signal (e.g., DMRS). In addition, the UE specific signal could be demodulated based on reception of a UE specific reference signal (e.g., DMRS).

In one embodiment, the common signal is for multiple UEs. The common signal is to be transmitted on every beam of the cell, TP, or TRP. In addition, the common signal could be a signaling indicating a system frame number (SFN), a signaling (e.g., on PDCCH) indicating resource allocation for a broadcast message (e.g., system information, paging, random access response) for UE(s) in the cell or for UE(s) connecting to the TP or TRP, a synchronization signal (e.g., a PSS or a SSS), and/or a reference signal for DL radio condition measurement (e.g., CRS). Furthermore, the common signal could be associated with a common reference signal (e.g., CRS). Also, the common signal could be demodulated based on reception of a common reference signal (e.g., CRS).

In one embodiment, all of the multiple subframes (for DL) could have the first symbol. Alternatively, not all of the multiple subframes (for DL) have the first symbol. In another embodiment, all of the multiple subframes (for DL) could have the second symbol. Alternatively, not all of the multiple subframes (for DL) have the second symbol In one embodiment, the first symbol could be in front of the second symbol in the subframe. Alternatively, the second symbol could be in front of the first symbol in the subframe.

In one embodiment, beam(s) of the cell, TP, or TRP generated in the first symbol is different from beam(s) generated in the second symbol. In one embodiment, the symbol could be an OFDM (Orthogonal Frequency Division Multiplexing) symbol.

As discussed above, a cell, TP, or TRP on the capacity layer may use beamforming for directional signal transmission or reception. To perform beamforming with a UE in the cell or a UE connecting to the TP or TRP, a base station should know which beam(s) of the cell, TP, or TRP the UE is located on, e.g. beam set of the UE. It is proposed in METIS Deliverable 2.4 that a UE transmits its position and speed to the base station and then the base station determines the direction of a downlink beam for the mobile device according to the received position and speed. However, information of the position and speed is not always available and reliable in the UE. Thus, it would be better to find another way for the base station to determine the beam set of a UE.

Currently as discussed in 3GPP TS 36.300 and 36.331, a random access (RA) procedure needs to be performed by a UE before data can be transferred via a cell, TP, or TRP. One possible way is that the base station could determine the initial beam set of a UE during the RA procedure, e.g., the beam set could be determined according to the beam(s) via which the dedicated RA preambles are received from the UE. However, with this method the base station needs to process the preambles on all beams of the cell, TP, or TRP, which would result in a very high system load. Therefore, it would be simpler to use a reference signal (RS) for beam set determination, i.e., the UE transmits the reference signal in the cell or to the TP or TRP. And the RA procedure could be initiated after the initial UE beam set has been determined. In this situation, the base station would only need to process the preamble(s) on the beam(s) in the UE beam set. It is expected that the beam number of a UE beam set (e.g., 4) would be much less than the total number of beams for one cell, TP, or TRP (e.g., 32, 64, or more). As a result, signal processing complexity could be reduced significantly.

According to the above concept, a random access (RA) procedure will be initiated after the beam set of a UE has been determined. One possible way to initiate the RA procedure is that the base station could transmit a request to the UE via the beam set of the UE to initiate the RA procedure. However, delay compensation (e.g., of a downlink transmission on different beams to the UE) would be required when the downlink transmission is performed via multiple beams. Otherwise, the UE may not be able to successfully decode the downlink transmission (e.g., including the request to initiate the RA procedure). Furthermore, it does not seem feasible for the base station to measure the delay of each beam based on the RS used for beam set determination. Therefore, a means or mechanism to let the UE initiate a random access procedure on the cell or to access the TP or TRP at proper timing should be considered.

The general concept of the invention is that a first base station (e.g., MeNB) controlling a first cell, TP, or TRP (e.g., in coverage layer) could provide configuration of a timer (or a counter) to a UE via the first cell, TP, or TRP. The UE would decide the timing to initiate a random access procedure (or to transmit a random access preamble) on a second cell or to access a second TP or TRP (e.g., in capacity layer) controlled by a second base station (e.g., SeNB) based on at least the timer (or the counter).

In one embodiment, the configuration could be included in a signaling. The signaling is a RRC message, e.g., a RRCConnectionReconfiguration message as discussed in 3GPP TS 36.331. The signaling could configure the UE to perform dual connectivity. The signaling could also be used to configure the second cell, TP, or TRP as a serving cell, TP, or TRP of the UE.

In addition, the signaling could also configure the UE to transmit a signal in the second cell or to the second TP or TRP. The signal could be transmitted periodically. The signal could be used to help the second base station detect beam(s) of the second cell, TP, or TRP for the UE. In one embodiment, the signal could be a reference signal (RS).

In one embodiment, the UE could start the timer (i) upon reception of the configuration, (ii) upon transmission of the signal (if the timer is not running), (iii) upon first transmission of the signal, or (iv) upon completion of synchronizing to the second cell, TP, or TRP. The counter could also be used to count transmission times of the signal.

In one embodiment, the UE could (i) initiate the random access procedure upon the timer expiry, (ii) transmit a random access preamble in response to the timer expiry, (iii) initiate the random access procedure upon reaching the maximum value of the counter, or (iv) transmit a random access preamble in response to reaching the maximum value of the counter.

In one embodiment, the uplink time of the UE is not aligned in the second cell, TP, or TRP (e.g., timeAlignment-Timer, as discussed in 3GPP TS 36.321, associated with the second cell, TP, or TRP is not running).

An alternative concept of the invention is that a second base station (e.g., SeNB) controlling a second cell, TP, or TRP (e.g., in capacity layer) determines beams of the second cell, TP, or TRP for a UE (i.e., a beam set for the UE). The second base station selects (only) one beam in the beam set (i.e., a first beam), and transmits a request (e.g., PDCCH order as discussed in 3GPP TS 36.321) on the first beam to the UE to initiate a random access procedure on the second cell or to access the second TP or TRP.

In one embodiment, the beam set includes multiple beams where a signal from the UE in the second cell or to the second TP or TRP has been detected. The first beam is where the signal has been detected with the largest received power. Received power of the signal on the first beam is larger than a threshold. Received power of the signal on multiple beams of the beam set is larger than the threshold. The signal could be a reference signal.

In one embodiment, delay compensation for beams in the beam set is not determined when transmitting the request. In other words, before delay compensation for beams in the beam set is determined, the second base station selects only one beam in the beam set for transmission to the UE. After delay compensation for beams in the beam set is determined, the second base station could select multiple beams in the beam set for transmission to the UE. Uplink time of the UE is not aligned in the second cell, TP, or TRP (e.g. timeAlignmentTimer, as discussed in 3GPP TS 36.321, associated with the second cell, TP, or TRP is not running, when transmitting the request).

Figure 19:
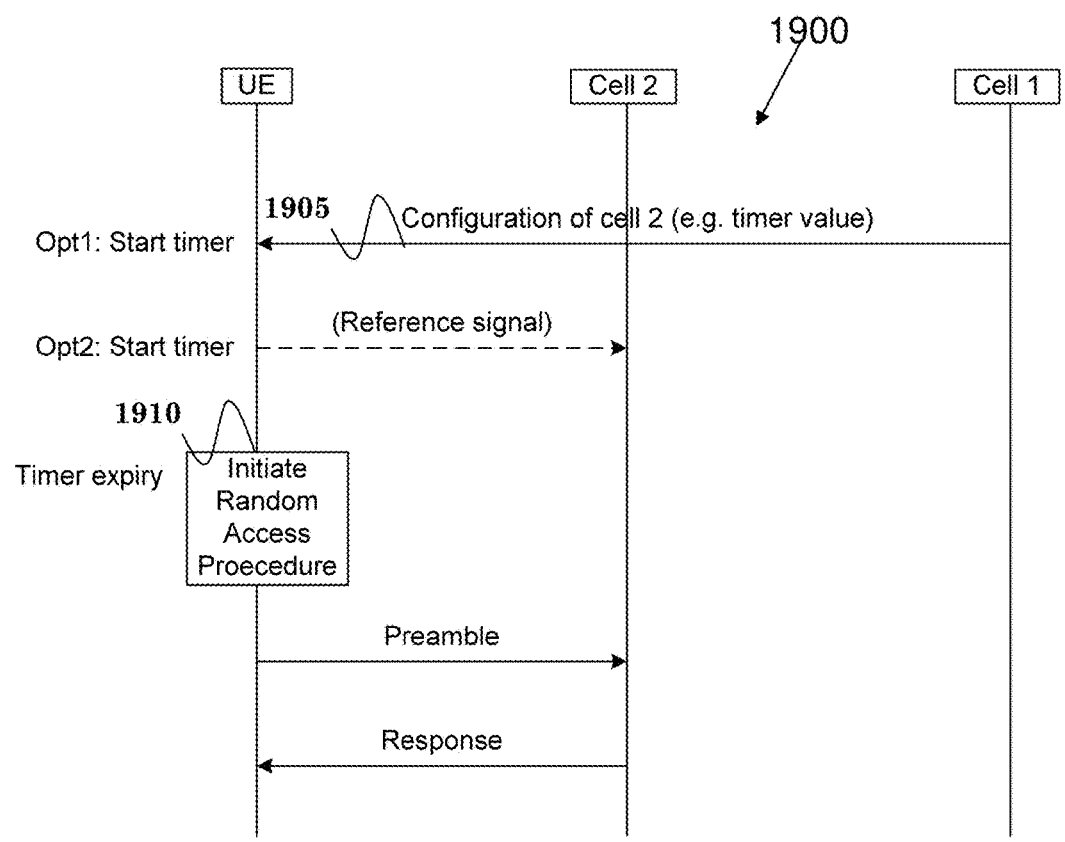
FIG. 19 is a message diagram according to one exemplary embodiment.

FIG. 19 is a message diagram 1900 in accordance with one embodiment. In step 1905, the UE receives a signaling indicating a configuration related to a timer or a counter. In step 1910, the UE initiates a random access procedure based on the timer or the counter. In one embodiment, the random access procedure is initiated on a second cell or is initiated to access a second TP or TRP. Furthermore, the random access procedure could be initiated upon expiry of the timer or upon reaching a specific value of the counter.

Figure 20:
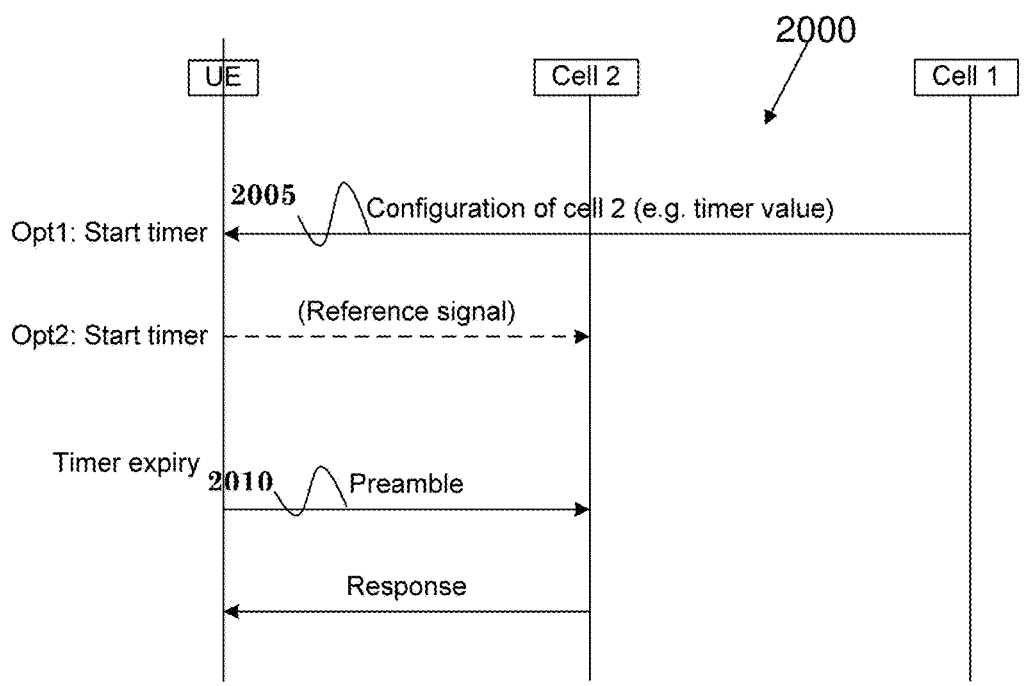
FIG. 20 is a message diagram according to one exemplary embodiment.

FIG. 20 is a message diagram 2000 in accordance with one embodiment. In step 2005, the UE receives a signaling indicating a configuration related to a timer or a counter. In step 2010, the UE transmits a random access preamble based on at least the timer or the counter. In one embodiment, the random access preamble is transmitted in a second cell or is transmitted to a second TP or TRP. Furthermore, the random access preamble could be transmitted in response to expiry of the timer, or in response to reaching a specific value of the counter.

With respect to the embodiments illustrated in FIGS. 19 and 20 and discussed above, the configuration could indicate a value of the timer or maximum value of the counter. Furthermore, the second cell, TP, or TRP could be controlled by a second base station. In addition, the signaling could be transmitted in a first cell or is transmitted to a first TP or TRP.

In one embodiment, the signaling could be transmitted by a first base station to control when the UE initiates the random access procedure or transmits the random access preamble. The first cell, TP, or TRP could be controlled by the first base station. Furthermore, the first base station could be an eNB (e.g., MeNB).

In one embodiment, the timer could be maintained by the UE. Furthermore, the timer could be started upon reception of the signaling, upon transmission of a specific signal (if the timer is not running), or upon first transmission of the specific signal.

In one embodiment, the counter is maintained by the UE. Furthermore, the counter is related to transmission times of a specific signal. The counter could be set to 0 upon reception of the signaling or upon first transmission of a specific signal.

In one embodiment, the signaling could indicate a configuration related to the specific signal, e.g. resource and/or periodicity. Furthermore, the signaling could tell the UE to perform dual connectivity. In addition, the signaling could indicate addition of the second cell, TP, or TRP as a serving cell, TP, or TRP of the UE. In one embodiment, the signaling could be a RRC message or a RRCConnectionReconfiguration message.

Figure 21:
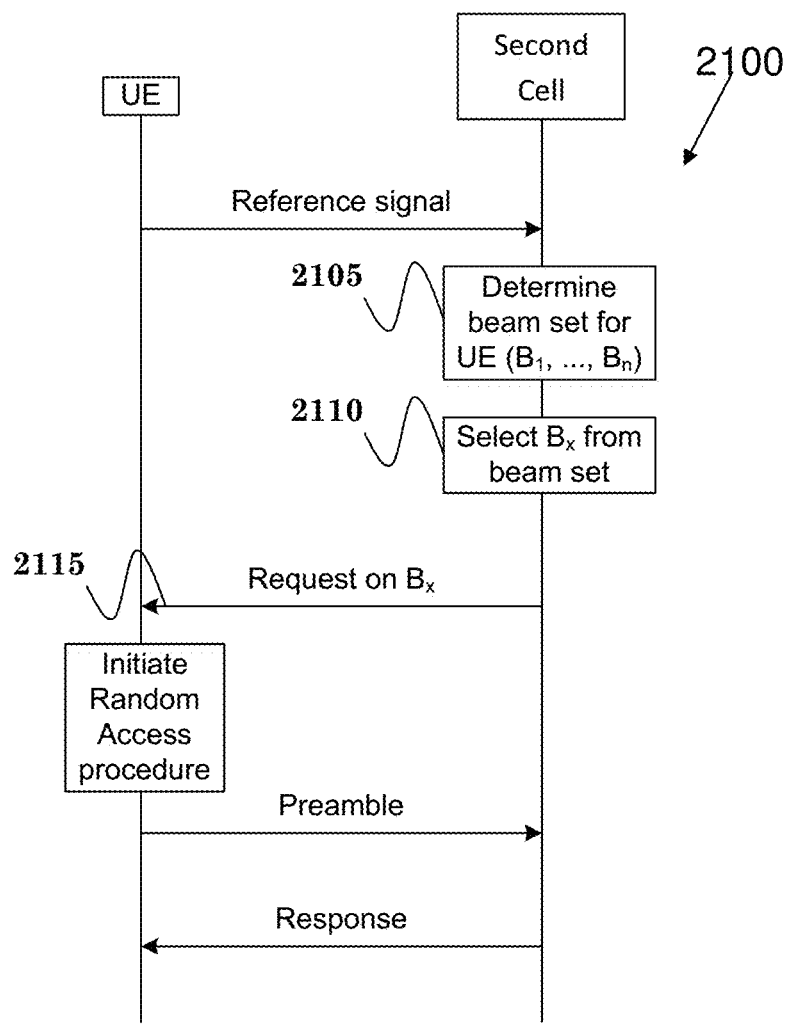
FIG. 21 is a message diagram according to one exemplary embodiment.

FIG. 21 is a message diagram 2100 in accordance with one embodiment from the perspective of a second base station controlling a second cell, TP, or TRP. In step 2105, a beam set for a UE is determined, wherein the beam set includes multiple beams. In step 2110, a first beam ($B_x$) is selected from the beam set. In step 2115, a request, which is used to ask the UE to initiate a random access procedure on the second cell or to access the second TP or TRP, is transmitted only on the first beam ($B_x$) to the UE. In one embodiment, the request could be a PDCCH order.

In one embodiment, beams in the beam set could be where a specific signal from the UE is received. Furthermore, beams in the beam set could be where a specific signal from the UE is received with a received power of the specific signal is larger than a first threshold.

In one embodiment, the beam set could be determined based on at least reception of a specific signal from the UE in the second cell or from the UE to the second TP or TRP. Furthermore, a specific signal could be received from the UE on the first beam with the largest received power. In addition, the first beam could be selected from the beam set based on a received power of a specific signal from the UE. The received power of a specific signal from the UE on the first beam could be larger than a second threshold. Also, the received power of a specific signal from the UE on multiple beams in the beam set could be larger than a second threshold. Furthermore, the second threshold could be larger than the first threshold.

In one embodiment, delay compensation of downlink transmission(s) to the UE for beams in the beam set is not determined.

With respect to the embodiments illustrated in FIGS. 19, 20, and 21 and discussed above, the random access procedure could be non-contention based. Furthermore, the random access procedure could be successfully completed in response to reception of a Timing Advance Command (e.g., in a MAC control element as discussed in 3GPP TS 36.321).

In one embodiment, the second cell, TP, or TRP uses beamforming. Furthermore, the second cell, TP, or TRP could have multiple beams. In addition, the UE could perform dual connectivity to connect to multiple cells, TPs, TRPs, or base stations.

In one embodiment, the specific signal could be transmitted periodically. Furthermore, the specific signal could be a reference signal (e.g., SRS as discussed in 3GPP TS 36.213). In addition, the specific signal could be transmitted in the second cell, or could be transmitted to the second TP or TRP.

In one embodiment, the specific signal is used to identify a beam set for the UE. In addition, the uplink timing of the UE is not aligned (e.g., in the second cell, TP, or TRP).

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a network node controlling a cell, comprising:
   communicating with a UE (User Equipment) in the cell via downlink and uplink transmissions, wherein the downlink and uplink transmissions are organized into radio frames and each radio frame contains multiple subframes and each subframe contains multiple symbols; and
   transmitting, in the cell, a UE specific signal to the UE in at least one first symbol of a downlink control region of a subframe of the multiple subframes and a common signal to the UE in at least one second symbol of the downlink control region of the subframe of the multiple subframes, wherein the network node does not transmit the common signal to the UE in the at least one first symbol and wherein the common signal and the UE specific signal indicate resources in different symbols of a data region of the subframe.

2. The method of claim 1, wherein the network node transmits the common signal at multiple timings to cover all beams of the cell.

3. The method of claim 1, wherein the network node transmits the UE specific signal in the at least second symbol.

4. The method of claim 1, wherein the network node does not transmit the UE specific signal in the at least one second symbol.

5. The method of claim 1, wherein the UE specific signal is a signaling indicating resource allocation, a signaling indicating HARQ (Hybrid Automatic Repeat reQuest) feedback, and/or a reference signal for demodulation.

6. The method of claim 1, wherein the common signal is a signaling indicating a system frame number (SFN), a signaling indicating resource allocation for a broadcast message, a synchronization signal, or a reference signal for DL radio condition measurement.

7. The method of claim 1, wherein beam(s) of the cell generated in the first symbol is different from beam(s) generated in the at least one second symbol.

8. The method of claim 1, wherein the network node transmits, in the cell, the UE specific signal on beam(s) of the cell corresponding to the UE.

9. The method of claim 1, wherein the network node transmits the common signal on predefined beams at a specific timing.

10. The method of claim 1, wherein the common signal and the UE specific signal indicate resources in completely different or partially different symbols of the data region of the subframe.

11. A method for a User Equipment (UE), comprising:
communicating with a network node in a cell via downlink and uplink transmissions, wherein the downlink and uplink transmissions are organized into radio frames, each radio frame includes multiple subframes, and each subframe includes multiple symbols;
monitoring, in the cell, a UE specific signal in at least one first symbol of a downlink control region of a subframe, and not monitoring a common signal in the at least one first symbol; and
monitoring, in the cell, the common signal in at least one second symbol of the downlink control region, wherein the common signal and the UE specific signal indicate resources in different symbols of a data region of the subframe.

12. The method of claim 11, wherein the common signal and the UE specific signal indicate resources in completely different or partially different symbols of the data region of the subframe.

13. The method of claim 11, wherein the UE monitors the UE specific signal in the second symbol.

14. The method of claim 11, wherein the UE does not monitor the UE specific signal in the at least one second symbol.

15. The method of claim 11, wherein the UE specific signal is a signaling indicating resource allocation, a signaling indicating HARQ (Hybrid Automatic Repeat reQuest) feedback, and/or a reference signal for demodulation.

16. The method of claim 11, wherein the common signal is a signaling indicating a system frame number (SFN), a signaling indicating resource allocation for a broadcast message, a synchronization signal, or a reference signal for DL radio condition measurement.

17. The method of claim 11, wherein a length of the downlink control region is two symbols and the UE does not monitor the UE specific signal in the at least one second symbol.

18. A User Equipment (UE) for communication with a network node, comprising:
a control circuit;
a processor installed in the control circuit; and
a memory installed in the control circuit and operatively coupled to the processor;
wherein the processor is configured to execute a program code stored in the memory to:
communicate with the network node in a cell via downlink and uplink transmissions, wherein the downlink and uplink transmissions are organized into radio frames, each radio frame includes multiple subframes, and each subframe includes multiple symbols;
monitor, in the cell, a UE specific signal in at least one first symbol of a downlink control region of a subframe, and not monitoring a common signal in the at least one first symbol; and
monitor, in the cell, the common signal in at least one second symbol of the downlink control region, wherein the common signal and the UE specific signal indicate resources in different symbols of a data region of the subframe.

19. The UE of claim 18, wherein the common signal and the UE specific signal indicate resources in completely different or partially different symbols of the data region of the subframe.

20. The UE of claim 18, wherein the UE monitors the UE specific signal in the second symbol.

21. The UE of claim 18, wherein the UE specific signal is a signaling indicating resource allocation, a signaling indicating HARQ (Hybrid Automatic Repeat reQuest) feedback, and/or a reference signal for demodulation.

22. The UE of claim 18, wherein the common signal is a signaling indicating a system frame number (SFN), a signaling indicating resource allocation for a broadcast message, a synchronization signal, or a reference signal for DL radio condition measurement.

23. The UE of claim 18, wherein a length of the downlink control region is two symbols and the UE does not monitor the UE specific signal in the at least one second symbol.

24. The UE of claim 18, wherein the UE does not monitor the UE specific signal in the at least one second symbol.

25. A network node for controlling a cell, comprising:
a control circuit;
a processor installed in the control circuit; and
a memory installed in the control circuit and operatively coupled to the processor;
wherein the processor is configured to execute a program code stored in the memory to:
communicate with a UE (User Equipment) in the cell via downlink and uplink transmissions, wherein the downlink and uplink transmissions are organized into radio frames and each radio frame contains multiple subframes and each subframe contains multiple symbols; and
transmit, in the cell, a UE specific signal to the UE in at least one first symbol of a downlink control region of a subframe of the multiple subframes and a common signal to the UE in at least one second symbol of the downlink control region of the subframe of the multiple subframes, wherein the network node does not transmit the common signal to the UE in the at least one first symbol and wherein the common signal and the UE specific signal indicate resources in different symbols of a data region of the subframe.

26. The network node of claim 25, wherein the network node transmits the common signal at multiple timings to cover all beams of the cell.

27. The network node of claim 25, wherein the network node transmits the UE specific signal in the at least one second symbol.

28. The network node of claim 27, wherein the common signal and the UE specific signal indicate resources in completely different or partially different symbols of the data region of the subframe.

29. The network node of claim 25, wherein the subframe includes a data region for uplink (UL), a data region for downlink (DL), and/or an UL control region.

30. The network node of claim 25, wherein the UE specific signal is a signaling indicating resource allocation, a signaling indicating HARQ (Hybrid Automatic Repeat reQuest) feedback, and/or a reference signal for demodulation.

31. The network node of claim 25, wherein the common signal is a signaling indicating a system frame number (SFN), a signaling indicating resource allocation for a broadcast message, a synchronization signal, or a reference signal for DL radio condition measurement.

32. The network node of claim 25, wherein beam(s) of the cell generated in the at least one first symbol is different from beam(s) generated in the at least one second symbol.

33. The network node of claim 25, wherein the network node transmits, in the cell, the UE specific signal on beam(s) of the cell corresponding to the UE.

34. The network node of claim 25, wherein the network node transmits the common signal on predefined beams in a specific timing.

* * * * *